(12) United States Patent
Fujiwara et al.

(10) Patent No.: US 10,774,178 B2
(45) Date of Patent: Sep. 15, 2020

(54) POLYETHYLENE TEREPHTHALATE RESIN COMPOSITION AND FILM FORMED FROM SAME

(71) Applicant: Toray Industries, Inc., Tokyo (JP)

(72) Inventors: Susumu Fujiwara, Mishima (JP); Hiromitsu Sai, Mishima (JP); Hitoshi Yoshimura, Mishima (JP); Yoshiki Kamigaito, Mishima (JP)

(73) Assignee: Toray Industries, Inc., Tokyo (JP)

( * ) Notice: Subject to any disclaimer, the term of this patent is extended or adjusted under 35 U.S.C. 154(b) by 148 days.

(21) Appl. No.: 15/771,899

(22) PCT Filed: Oct. 17, 2016

(86) PCT No.: PCT/JP2016/080660
§ 371 (c)(1),
(2) Date: Apr. 27, 2018

(87) PCT Pub. No.: WO2017/073385
PCT Pub. Date: May 4, 2017

(65) Prior Publication Data
US 2018/0319977 A1    Nov. 8, 2018

(30) Foreign Application Priority Data

Oct. 29, 2015 (JP) ................. 2015-213051
Nov. 26, 2015 (JP) ................. 2015-230429

(51) Int. Cl.

| | | |
|---|---|---|
| *C08G 63/183* | (2006.01) | |
| *C08J 5/18* | (2006.01) | |
| *C08K 3/08* | (2006.01) | |
| *C08L 67/02* | (2006.01) | |
| *C08G 63/87* | (2006.01) | |
| *C08G 63/86* | (2006.01) | |
| *C08G 63/83* | (2006.01) | |

(52) U.S. Cl.
CPC .............. *C08G 63/183* (2013.01); *C08J 5/18* (2013.01); *C08K 3/08* (2013.01); *C08L 67/02* (2013.01); *C08G 63/83* (2013.01); *C08G 63/866* (2013.01); *C08G 63/87* (2013.01)

(58) Field of Classification Search
CPC .... C08G 63/183; C08G 63/83; C08G 63/866; C08G 63/87; C08K 3/08; C08J 5/18; C08L 67/02
See application file for complete search history.

(56) References Cited

U.S. PATENT DOCUMENTS

| | | | |
|---|---|---|---|
| 6,797,630 B1* | 9/2004 | Wu ..................... | H01L 21/0337 257/E21.038 |
| 2008/0255280 A1* | 10/2008 | Sims ...................... | C08L 67/02 524/176 |
| 2010/0305296 A1* | 12/2010 | Qi .......................... | C08G 63/85 528/279 |
| 2014/0023841 A1* | 1/2014 | Suzuki .................... | C08K 3/32 428/213 |
| 2015/0183957 A1* | 7/2015 | Sakellarides ........ | C08K 5/3492 523/333 |

FOREIGN PATENT DOCUMENTS

| | | |
|---|---|---|
| JP | 61-174223 A | 8/1986 |
| JP | 11-21337 A | 1/1999 |
| JP | 2003-096280 A | 4/2003 |
| JP | 2014-022027 A | 2/2014 |
| JP | 2014-118574 A | 6/2014 |
| WO | 2008/029842 A1 | 3/2008 |
| WO | 2010/103945 A1 | 9/2010 |

\* cited by examiner

*Primary Examiner* — Ling Siu Choi
*Assistant Examiner* — Gennadiy Mesh
(74) *Attorney, Agent, or Firm* — DLA Piper LLP (US)

(57) ABSTRACT

A polyethylene terephthalate resin composition which is characterized by having a manganese element content of 30 to 60 ppm, a potassium element content of 2 to 10 ppm, an antimony element content of 70 to 150 ppm, a molar ratio of metal elements to phosphorus element (M/P=(M1+M2/2)/P) satisfying formula (1), and a gelation ratio of 5% by weight or less:

$$0.6 \leq (M1+M2/2)/P \leq 1.3 \tag{1}$$

wherein M1 represents the content (mol/t) of a bivalent metal element selected from the group consisting of Mg, Mn, and Ca; M2 represents the content (mol/t) of a monovalent metal element selected from the group consisting of Li, Na, and K; and P represents the content (mol/t) of phosphorus element.

6 Claims, No Drawings

POLYETHYLENE TEREPHTHALATE RESIN COMPOSITION AND FILM FORMED FROM SAME

TECHNICAL FIELD

This disclosure relates to polyethylene terephthalate resin compositions and films formed from the same.

BACKGROUND

Polyethylene terephthalate resin compositions have excellent mechanical characteristics, heat characteristics, chemical resistance, electrical characteristics, and formability, are widely used for various applications, and are demanded in increasing quantity. Along with the expansion of the applications and demand, however, the characteristics and productivity that the polyesters need are more and more stringent in each application field.

Whenever processed into a form, a polyethylene terephthalate resin composition is melted and extruded at a temperature of 250° C. to 300° C., which is equal to or greater than the melting point of the polyester, but this temperature condition will also cause the polyester to undergo thermal decomposition and then oxidative decomposition if contaminated with oxygen. There is a problem in that this results in generating gelatinous foreign matter and causes defects on the surface of the film.

JP 2003-96280 A describes polyethylene terephthalate resin compositions in which a ratio of the amount of alkaline earth metal and alkali metal to the amount of a phosphorus compound, M/P, is within a specific range. JP 11-21337 A and JP 2014-22027 A describe polyesters and polyester films for which manganese acetate is used.

A polyethylene terephthalate resin composition described in JP '280 is regulated at a high M/P to thereby have a gelation ratio reduced when left to stand under the conditions of a 20% oxygen concentration and 300° C. for 5 hours, but a high M/P will accelerate thermal decomposition and fails to afford sufficient heat resistance to the composition. In addition, magnesium acetate is used therefore and thus the gelation ratio is no more reduced in a further long time.

JP '337 describes Examples in which manganese acetate is used, and a sufficient gelation suppression effect is not obtained because the M/P is high.

JP '027 also describes Examples in which manganese acetate is used, but a large amount of antimony is used, which poses a concern about solution haze and defects caused by antimony. In addition, the gelation ratio is not expected to be improved sufficiently.

It could therefore be helpful to provide a polyethylene terephthalate resin composition that generates less gelled matter in a melt-extruding process, causes a smaller change in color tone and a smaller amount of oligomer generation during heating, and has excellent transparency (solution haze) and film formability.

SUMMARY

We thus provide:
(1) A polyethylene terephthalate resin composition having a manganese element content of 30 to 60 ppm, a potassium element content of 2 to 10 ppm, and an antimony element content of 70 to 150 ppm with respect to the total weight of elements of the polyethylene terephthalate resin composition, in which a molar ratio of metal elements to phosphorus element, (M/P=(M1+M2/2)/P), satisfies formula (1), and in which the composition has a gelation ratio of 5% by weight or less:

$$0.6 \leq (M1+M2/2)/P \leq 1.3 \tag{1}$$

wherein M1 represents the content (mol/t) of a bivalent metal element selected from the group consisting of Mg, Mn, and Ca;
M2 represents the content (mol/t) of a monovalent metal element selected from the group consisting of Li, Na, and K; and
P represents the content (mol/t) of phosphorus element.
(2) The polyethylene terephthalate resin composition according to (1), in which the total content of metal elements: Mg, Ca, and Li is less than 0.1 ppm.
(3) The polyethylene terephthalate resin composition according to (1) or (2), in which the composition generates linear oligomer in an amount of 210 μg/g or less when melted at 290° C. for 20 minutes.
(4) The polyethylene terephthalate resin composition according to any of (1) to (3), in which the composition comprises internal particles whose largest particle diameter is 0.3 μm or less, and has 1.0% or less solution haze.
(5) The polyethylene terephthalate resin composition according to any of (1) to (4), in which the content of phosphorus element is 15 ppm to 45 ppm.
(6) The polyethylene terephthalate resin composition according to any of (1) to (5), having a COOH terminal group content of 25 to 40 eq/t, in which the COOH terminal group amount increased between before and after heat-moisture treatment is 80 eq/t or less.
(7) The polyethylene terephthalate resin composition according to (1), having an intrinsic viscosity of 0.60 to 0.70, a COOH terminal group content of 5 to 20 eq/t, and 0.40% by weight or less of cyclic trimeric oligomer.
(8) A polyester film formed from the polyethylene terephthalate resin composition according to any of (1) to (7).

The polyethylene terephthalate resin composition generates less foreign matter into which the polyethylene terephthalate resin composition has gelled in a melt-extruding process, causes a smaller change in color tone and a smaller amount of oligomer generation during heating, and has good transparency (solution haze) and good film formability (electrostatic casting properties). In addition, the composition generates a smaller amount of oligomer when melted, and thus can provide a film having fewer process contamination and less film defects in film formability.

DETAILED DESCRIPTION

Our compositions and films will be described in detail below.

Examples of components of the polyethylene terephthalate resin composition include: a terephthalic acid or naphthalenedicarboxylic acid component as a dicarboxylic acid component; and an alkylene glycol component such as ethylene glycol or propylene glycol as a diol component.

Further, in the polyethylene terephthalate resin composition, up to 20 mol % of the carboxylic acid components can contain, as a copolymerization component, one or more dicarboxylic acids other than a terephthalic acid component and a naphthalenedicarboxylic acid component, and similarly up to 20 mol % of the glycol components can contain, as a copolymerization component, one or more glycol components other than an ethylene glycol component or an alkylene glycol component. Further, the composition may contain a trifunctional or multifunctional compound as a copolymerization component, to the extent that the composition does not lose thermoplasticity.

The polyester needs to contain 70 to 150 ppm antimony element. It is preferably 90 to 130 ppm, more preferably 100 to 120 ppm. If the content is more than 150 ppm, antimony metal is deposited, thereby increasing solution haze in the polyethylene terephthalate resin composition, which will cause the film to lose transparency. On the other hand, a content of less than 70 ppm increases a color tone b value and increases a gelation ratio.

The polyethylene terephthalate resin composition needs to contain 30 to 60 ppm manganese element. It is preferably 35 to 50 ppm, more preferably 40 to 50 ppm. A content of more than 60 ppm increases a color tone b value, increases a gelation ratio, and increases the amount of linear oligomer generated in heat-melting. On the other hand, a content of less than 30 ppm results in degrading film formability in the view point of electrostatic casting.

The polyethylene terephthalate resin composition needs to contain 2 to 10 ppm potassium element. Potassium element has a large electropositivity and thus lowers the melt specific resistance of the polyethylene terephthalate resin composition, thereby enhancing electrostatic charging properties in film-forming and also affording good transparency (solution haze) to the obtained polymer. It is preferably 3 to 7 ppm, more preferably 4 to 6 ppm. A content of more than 10 ppm results in increasing a haze and increasing a gelation ratio. On the other hand, a content of less than 2 ppm results in degrading film formability in the view point of electrostatic casting.

The polyethylene terephthalate resin composition needs to satisfy formula (1):

$$0.6 \leq (M1+M2/2)/P \leq 1.3 \quad (1).$$

More preferably, (M1+M2/2)/P is 0.7 or more but 1.2 or less, further preferably 0.8 or more but 1.1 or less. If (M1+M2/2)/P is less than 0.6 ppm, the film formability are degraded in the view point of electrostatic casting, and more than 1.3 increases a gelation ratio and increases a color tone b value.

The polyethylene terephthalate resin composition contains Mg, Ca, and Li in an amount of preferably less than 0.1 ppm for the purposes of suppressing a gelation ratio and reducing a color tone b value. A content of less than 0.1 ppm enables the maintenance of a low gelation ratio and further can reduce the deterioration of color tone and the generation of linear oligomer in heat-melting.

The gelation ratio is 5% by weight or less, preferably 3% by weight or less. The gelation ratio of more than 5% by weight causes defects on the film, posing a problem. In addition, the gel clogs filters in a film-forming process and increases filtration pressure, thereby posing a problem by increasing the frequency of exchange and cleaning of filters and leading to production capacity reduction and cost increase.

Examples of oligomers include, but are not particularly limited to: linear oligomers such as terephthalic acid, mono-2-hydroxyethyl terephthalate, and bis-2-hydroxyethyl terephthalate; and cyclic trimeric oligomers.

The amount of linear oligomer generated when the polyethylene terephthalate resin composition is heated at 290° C. for 20 minutes is preferably 210 μg/g or less, more preferably 205 μg/g or less, further preferably 200 μg/g or less. By controlling the generated amount of linear oligomer to 210 μg/g or less, process contamination during heat-processing in a film-forming process can be prevented and, in particular, film defects during film-forming can be suppressed.

The polyethylene terephthalate resin composition contains cyclic trimeric oligomer in an amount of preferably 0.50 wt % or less, more preferably 0.40 wt % or less, further preferably 0.35 wt % or less. A low content of cyclic trimeric oligomer makes it difficult for the cyclic trimeric oligomer to be deposited on the film surface during film-forming or in a film-processing process. The content of cyclic trimeric oligomer is not limited to a particular lower limit, but is preferably 0.10 wt % or more in that a higher content prolongs the time required for solid phase polymerization which reduces cyclic trimeric oligomer, thereby causing a large increase in intrinsic viscosity and a tendency to increase load in melt-extruding.

The largest particle diameter of internal particles is preferably 0.3 μm or less, more preferably 0.25 μm or less, further preferably 0.22 μm or less. By containing internal particles whose largest particle diameter is 0.3 μm or less, the polyester resin can maintain transparency (solution haze).

The polyethylene terephthalate resin composition has a solution haze of preferably 1.0% or less, more preferably 0.9 wt % or less, further preferably 0.8 wt % or less. A solution haze of 1.0% or less enables the resin to maintain transparency, which makes the composition preferred as a film for process applications, particularly a film for mold release applications.

The content of phosphorus element is preferably 15 to 45 ppm, more preferably 20 to 40 ppm, further preferably 25 to 35 ppm. Containing a phosphorus compound in this range can afford a polyethylene terephthalate resin composition having low solution haze and low melt specific resistance.

The polyethylene terephthalate resin composition preferably has a carboxyl (COOH) terminal group content of 25 to 40 eq/t, more preferably 28 to 37 eq/t, further preferably 30 to 35 eq/t. The COOH terminal group content in the above-mentioned ranges can suppress decomposition reaction and suppress blemishes and the like in film-forming processing. In addition, to obtain good hydrolysis resistance, a lower COOH terminal group content is more advantageous, and it is preferably 5 to 20 eq/t, more preferably 5 to 15 eq/t, further preferably 5 to 10 eq/t. In this case, the lower limit of the COOH terminal group content is, the better the hydrolysis resistance is, and the lower limit is considered to be about 5 eq/torr in conventional polycondensation reactions and solid phase polymerization reactions. To achieve a COOH terminal group content of 0 eq/ton, an excessive amount of a terminal blocking agent is required.

An increase in the amount of COOH terminal groups (ΔCOOH) which is caused when the polyethylene terephthalate resin composition is treated under water vapor at 155° C. for 4 hours is preferably 80 eq/t or less, more preferably 75 eq/t or less, further preferably 70 eq/t or less. An increase within this range can suppress decomposition reaction during melting and prevent the generated oligomer from causing process contamination and film defects.

Below, methods of producing the polyethylene terephthalate resin composition will be described in detail.

As methods of producing polyester compositions, those of a batch type and a continuous type are well-known, and continuous polymerization, which involves less heat history, is preferable to achieve a lower gelation ratio.

Further, as reaction processes in production methods of a batch type and a continuous type, there are a esterification method using terephthalic acid as a raw material and a DMT method using dimethyl terephthalate as a raw material, and the esterification method is preferable in the view point of cost and reaction efficiency.

In producing the polyethylene terephthalate resin composition in continuous polymerization facilities, the number of reaction vessels is not limited to a particular one but, for example, in production with a esterification method, one or more vessels for esterification reaction and two or more vessels for polycondensation reaction are preferably used in the view point of reaction efficiency, and two vessels as esterification vessels and three vessels for polycondensation reaction are further preferably used.

Examples of antimony compounds used as polymerization catalysts include antimony trioxide, antimony pentoxide, antimony acetate, antimony salts of aliphatic carboxylic acids, and the like, and among these, antimony trioxide is preferably used in the view point of polycondensation reactivity, the color tone of the obtained polymer, and inexpensive availability.

Examples of methods of adding antimony include using it in powder form, in ethylene glycol slurry, in ethylene glycol solution and the like, and it is preferably added in ethylene glycol solution because of the capability to prevent antimony from aggregating and thereby being coarsened and to afford good transparency (solution haze) as a result. Examples of phosphorus compounds include phosphoric acid, phosphorous acid, phosphonic acid, ester compounds thereof, and the like, and phosphoric acid is preferably used because of the capability to reduce gelation ratio. Methods of adding a phosphorus compound is not limited to a particular one. The compound can be added with various methods using an aqueous solution, an ethylene glycol solution, and the like.

In producing the polyethylene terephthalate resin composition, a potassium compound is preferably added at two or more positions in a reaction process, considering the transparency of the composition. The position of addition is not limited to a particular one, but, for example, when the number of esterification reaction vessels is two and that of polycondensation reaction vessels is three in a esterification method, the potassium compound is preferably added to the two esterification reaction vessels. Adding the potassium compound to two esterification reaction vessels can suppress a rapid decrease in temperature in the system, and the addition can be carried out without reducing the dispersibility of the potassium compound, whereby the largest particle size of the internal particles produced during polycondensation can be made smaller to thus enable the reduction of solution haze.

Examples of potassium compounds include potassium hydroxide, potassium acetate, and the like, and potassium hydroxide is preferable in the view point of color tone and solution haze.

Examples of manganese compounds include manganese acetate, manganese oxide, and the like, and manganese acetate is preferably used in the view point of color tone, solution haze, and suppression of gelation ratio.

Examples of forms of addition of a manganese compound include using it in powder form, adding it in ethylene glycol slurry or ethylene glycol solution, adding it in an aqueous solution, and the like, and adding it in a solution mixture of water and ethylene glycol is preferable in the view point of color tone, solution haze, and reaction efficiency. Specifically, the manganese compound is preferably added in a solution having a water concentration of 10% or less and an ethylene glycol concentration of 90% or more in the view point of color tone.

The polyethylene terephthalate resin composition has manganese element and antimony element at a ratio (Mn/Sb) that preferably satisfies formula (2):

$$0.40 \leq (Mn/Sb) \leq 1.25 \quad (2)$$

wherein Mn represents a manganese element content, Sb represents an antimony element content, and Mn and Sb each indicate the total number of moles per $10^6$ g of the polyethylene terephthalate resin composition. With regard to the intrinsic viscosity of the polyethylene terephthalate resin composition, the endpoint of melt polymerization can be determined on the basis of the stirring torque of the polymer, and torque to determine the endpoint can be set on a melt polymerization device so that the composition can obtain an intrinsic viscosity of interest. Then, using a method in which the obtained melt polyethylene terephthalate resin composition is discharged in strand form through a die, cooled, and pelletized with a cutter, a liquid phase polyethylene terephthalate resin composition can be produced.

In addition, the obtained liquid phase polyethylene terephthalate resin composition is preferably subjected to solid phase polymerization to have a further lower amount of cyclic trimeric oligomer and a further lower amount of COOH terminal groups. Examples of solid phase polymerization methods include the below-mentioned.

It is preferable that the polyethylene terephthalate resin composition obtained through liquid phase polymerization be preliminarily crystallized before being subjected to solid phase polymerization. For the preliminary crystallization of the polyethylene terephthalate resin composition, a method in which a mechanical impact is made on the composition to thereby subject it to shearing treatment, a method in which the composition is heated under a hot air stream, and the like can be adopted.

The preliminarily crystallized polyethylene terephthalate resin composition is subsequently subjected to solid phase polymerization. The polyethylene terephthalate resin composition is fed into a solid phase polymerization device, through which an inert gas flow is passed, and the composition is subjected to solid phase polymerization at a predetermined temperature. The polyethylene terephthalate resin composition of which the solid phase polymerization has completed is cooled and then taken out of the device.

The intrinsic viscosity of the polyethylene terephthalate resin composition to be subjected to solid phase polymerization is preferably 0.40 to 0.52, more preferably 0.45 to 0.50. An intrinsic viscosity of 0.40 or more is preferable because it reduces the amount of cyclic trimeric oligomer at a predetermined temperature or in a predetermined time, thereby enhancing productivity. An intrinsic viscosity of 0.52 or less is preferable because it facilitates crystallization in a short time and reduces the amount of cyclic trimeric oligomer before the intrinsic viscosity of the polyethylene terephthalate resin composition is raised, and the intrinsic viscosity of 0.52 or less is preferable also because it causes less heat history and thus suppresses the coloring of the polyethylene terephthalate resin composition.

Examples of inert gases include: rare gases such as helium, neon, argon and the like; nitrogen gas; carbon dioxide gas; and the like. Among these, nitrogen is preferable because it is readily available. In addition, the dew point of an inert gas is preferably −5° C. or higher. An inert gas having a dew point of −5° C. or more is preferable because it can suppress the reduction of carboxyl terminal groups of the polyethylene terephthalate resin composition in solid phase polymerization. The dew point of an inert gas is not limited to a particular upper limit, and is preferably 20° C. or less in order to facilitate solid phase polymerization smoothly.

Temperatures at which solid phase polymerization is carried out are preferably at 200 to 220° C., more preferably 210 to 215° C. A temperature of 200° C. or more is preferable because it facilitates a decrease in the amount of cyclic trimeric oligomer smoothly. A temperature of 220° C. or less is preferable to suppress the coloring that is caused to the polyethylene terephthalate resin composition through heat deterioration.

A solid phase polymerization device is not limited to a particular model but, for example, a stationary type dryer, a fluid type dryer, a dryer having a stirring blade, a continuous type tower dryer, and the like can be used, and a continuous type tower dryer is preferable in the view point of productivity.

The polyethylene terephthalate resin composition can be formed into a polyester film in the following manner. For example, the polyethylene terephthalate resin composition is dried in vacuo, supplied into an extruder, dissolved at 260 to 300° C., extruded in sheet form through a T-die, wound with an electrostatic casting method on a mirror casting drum whose surface temperature is 10 to 60° C., and solidified by cooling, to produce an unstretched polyester film.

The unstretched film is stretched 2.5- to 5-fold in the longitudinal direction between rolls heated to 70 to 120° C. At least one side of this film may be coated with a coating solution and the like by carrying out corona discharge treatment. Subsequently, the film is stretched 2.5- to 5-fold in the transverse direction in a hot air zone continuously heated to 70 to 150° C., then introduced into a heat treatment zone where temperature is kept at 200 to 240° C., heat-treated for 5 to 40 seconds, and passed through a cool zone which is kept at 100 to 200° C., to complete crystalline orientation. In addition, the film may be relaxed by 3 to 12% in the transverse direction or the longitudinal direction, if necessary, during the above-mentioned heat treatment. The obtained polyethylene terephthalate resin composition is preferred as a film for industrial material applications, especially for mold release applications, because the composition has excellent transparency, heat resistance, and wet heat resistance and forms a smaller amount of gel that originates film defects, while being capable of reducing the amount of linear oligomer generated during melt-processing. An example of composition considered to be the gel mentioned could be PET molecules which are cross-linked.

EXAMPLES

Below, our compositions and films will be specifically described with reference to Examples. Here, the measurement methods in Examples are as below-mentioned.

(1) Gelation Ratio

The polyethylene terephthalate resin composition was pulverized using a cryogenic mill (made by Sprex CertiPerp, Inc.), and weighed out at 0.5 g into a stainless steel beaker. The resulting sample was dried in vacuo at 50° C. for 2 hours using a vacuum dryer; air and nitrogen were made into a gas mixture having an oxygen concentration of 1%; the container containing the sample was sufficiently purged with the gas mixture having an oxygen concentration of 1% passed through piping; and the container was then immersed in an oil bath at 300° C. and heated under a stream of 1% concentration oxygen/nitrogen (at a flow rate of 0.5 L/minute) for 6 hours. This sample was dissolved in 20 ml of orthochlorophenol (hereinafter referred to as OCP) at 160° C. for one hour and left to stand. This solution was filtered using a glass filter (3GP40, made by Sibata Scientific Technology Ltd.), and the glass filter was cleaned with dichloromethane. The glass filter was dried at 130° C. for two hours, and the weight of the OCP-insoluble matter (gel) remaining on the filter was calculated from the increase in the weight of the filter between before and after filtration, whereby the weight percentage of the OCP-insoluble matter with respect to the polyester weight (0.5 g) was determined and regarded as a gelation ratio (% by weight). With the obtained polyester, a gelation ratio of 5.0% by weight or less was rated good and 3.0% by weight or less best. More than 5.0% by weight was rated unacceptable in terms of film defects and film-forming process productivity.

(2) COOH Terminal Group Content

The esterified product and polyethylene terephthalate resin composition obtained through liquid phase polymerization were measured using the Maulice method described in the following document: M. J. Maulice, F. Huizinga "Anal. Chim. Acta" Vol. 22, p-363 (1960). In other words, 2 g of the esterified reactant or the polyethylene terephthalate resin composition was dissolved in 50 ml of o-cresol/chloroform (at a weight ratio of 7/3), the resultant solution was titrated with an N/20-sodium hydroxide methanol solution, and the COOH terminal group content was measured and expressed in terms of eq/ton of polyester. In addition, 2 g of the polyethylene terephthalate resin composition obtained through solid phase polymerization was dissolved in o-cresol, the resultant solution was titrated with an N/20-sodium hydroxide methanol solution, and the COOH terminal group content was measured and expressed in terms of eq/ton of polyester. A potentiometric titration method was used to draw a titration curve, and the inflection point thereof was used as an endpoint to determine a COOH terminal group content.

(3) Solution Haze of Polyethylene Terephthalate Resin Composition

The polyethylene terephthalate resin composition in an amount of 0.5 g was dissolved in 20 ml of a solvent mixture of phenol/ethane tetrachloride (at a ratio by weight of 6/4) with stirring at 100° C. for 60 minutes, and cooled to room temperature; and then the solution was poured into a 20 mm glass cell, and measured using a haze computer (HGM-2DP) made by Suga Test Instruments Co., Ltd.

(4) Largest Particle Diameter of Internal Particles

The largest particle diameter of particles was measured using a particle diameter analyzer (LA-950, made by Horiba, Ltd.). The diameters of the internal particles as equivalent circular diameters and their frequencies (%) were measured in a range of 0.01 μm to 3000 μm, and the largest particle size value in the particle diameter distribution was taken.

(5) Measurement of COOH Terminal Groups Before and after Heat-Moisture Treatment (Hereinafter May be Referred to as ΔCOOH)

Chips of the polyethylene terephthalate resin composition were treated in water vapor at 155° C. for 4 hours.

The measurement device was PRESSURE COOKER 306SIII (made by Hirayama Manufacturing Corp.).

The increase amount of COOH terminal groups was measured in accordance with (2). The increase amount of COOH terminal groups (ΔCOOH) was evaluated with the samples before and after treatment. A ΔCOOH of 90 eq/t or less, which is considered applicable to photovoltaic cell applications, was rated acceptable.

(6) Alkali Metal Content in Polyethylene Terephthalate Resin Composition

The contents of Li and K were quantified with atomic absorption spectrophotometry (a Zeeman splitted spectrum type atomic absorption spectrophotometer 180-80 made by Hitachi Ltd.; flame: acetylene-air).

(7) Phosphorus Element Content and Bivalent Metal Element Content in Polyethylene Terephthalate Resin Composition A fluorescent X-ray type analyzer (model number: 3270) made by Rigaku Corporation was used to measure the contents of P, Mn, Mg, Ca, and Sb with sample pellets of the polyethylene terephthalate resin composition which were molded into a cylindrical form using a melt-press machine.

(8) Amount of Linear Oligomer Generated after Melting at 290° C. for 20 Minutes (Hereinafter May Simply be Referred to as Linear Oligomer Generation Amount)

The polyethylene terephthalate resin composition in an amount of 0.1 g was freeze-pulverized, dried in vacuo at 160° C. for 6 hours, and then encapsulated in ampoules under a N2 atmosphere. The ampoules were then heated at 290° C. for 20 minutes; LC20A (made by Shimadzu Corporation) was used to measure the amounts of terephthalic acid, mono-2-hydroxyethyl terephthalate, and bis-2-hydroxyethyl terephthalate as linear oligomers; and the total amount thereof was regarded as a linear oligomer generation amount.

(9) Intrinsic Viscosity

The polyethylene terephthalate resin composition obtained through liquid phase polymerization was measured for solution viscosity at 25° C., using 0.1 g of the composition which was dissolved in 10 ml of o-chlorophenol at 100° C. in 30 minutes. In addition, the polyethylene terephthalate resin composition obtained through solid phase polymerization was measured for solution viscosity at 25° C., using 0.1 g of the composition which was dissolved in 10 ml of o-chlorophenol at 160° C. in 15 minutes.

(10) Esterification Reaction Ratio of Esterified Reactant

The total COOH terminal group amount A and the unreacted COOH terminal group amount B in the oligomer of the polyethylene terephthalate resin composition were determined using the below-mentioned method, and an esterification reaction ratio was calculated using the following formula.

Esterification Reaction Ratio (%)=[(A−B)/A]×100

The total COOH terminal group amount A was measured using an automatic titrator (COM-550, made by Hiranuma Sangyo Co., Ltd.) and a 0.5 N hydrochloric acid solution to titrate the solution obtained by hydrolysing the oligomer of the polyethylene terephthalate resin composition with a potassium hydroxide aqueous solution. In addition, the unreacted COOH terminal group amount B was measured using an automatic titrator (COM-550, made by Hiranuma Sangyo Co., Ltd.) and a methanol solution of 0.1 N potassium hydroxide to titrate the polyester oligomer dissolved in N,N-dimethyl formamide.

(11) Melt Specific Resistance

Two copper plates were used to sandwich a spacer made of Teflon (registered trademark) therebetween to form electrodes composed of 22 $cm^2$ copper plates spaced 9 mm therebetween. These electrodes were immersed in the polyethylene terephthalate resin composition melted at 290° C., and a resistance was calculated from the amount of current generated when a voltage of 5,000V was applied across the electrodes.

(12) Color Tone b Value (b Value)

The resin pellets of the polyethylene terephthalate resin composition were filled into a cylindrical powder measurement cell, and a color difference meter (SM Color Meter SM-T, made by Suga Test Instruments Co., Ltd.) was used to measure a color tone b value with a reflection method.

(13) Cyclic Trimeric Oligomer Content

The sample pellets or film of the polyethylene terephthalate resin composition was dissolved in o-chlorophenol, to which an internal standard was added. Further, methanol was added to the resulting mixture to deposit a polymer; the supernatant was taken from the resulting solution by means of centrifugation; and the cyclic trimeric oligomer was quantitated using a liquid chromatograph (made by Shimadzu Corporation; SYSTEM CONTROLLER Model Number: SCL-10A VP, LIQUID CHROMATOGRAPH Model Number: LC-10AD VP, UV-VIS DETECTOR Model Number: SPD-10A VP, COLUMN OVEN Model Number: CTO-10A VPLC-2010A).

(14) Regeneration Rate of Cyclic Trimeric Oligomer

The sample pellets of the polyethylene terephthalate resin composition were dried in vacuo at 175° C. for 7.5 hours, melted by means of heating under a nitrogen atmosphere at 300° C. for 30 minutes, then cooled to normal temperature, and solidified, to take a sample. The cyclic trimeric oligomer content (A) in the sample which had yet to be melted by means of heating and the cyclic trimeric oligomer content (B) in the sample which had been melted by means of heating were quantified, and the regeneration rate (C) of the cyclic trimeric oligomer was calculated from the following formula.

$C$ (wt %/minute)=$(B-A)/30$

(15) Film Defects During Long-Term Extrusion (Also Referred to as Film Defects)

The polyethylene terephthalate chips were dried at 160° C. for 5 hours, supplied into an extruder equipped with a T-die, and extruded in the shape of a casting drum through the die at 300° C. with the casting drum being rotated, to obtain an unstretched film continuously. The surface of the film was observed for one hour after 10 hours elapsed and until 11 hours elapsed. It was rated unacceptable if any stripe-like defect, none of which was observed before the 10 hours period elapsed, was newly observed on the surface in this one hour period. It was rated acceptable if no such defect was observed.

(16) Electrostatic Casting Properties

A direct current voltage of 6 kV was applied across an electrode disposed above the melt-extruded film and a cooling roll; the casting rate was gradually increased; a casting rate (m/min) was determined when any irregularity was generated by voltage application; and the casting rate was evaluated in accordance with the following criteria. Grade 2 or higher is rated acceptable. Grade 1 is given for 50 m/min or more, Grade 2 for 40 m/min or more but 50 m/min or less, Grade 3 for 30 m/min or more but 40 m/min or less, and Grade 4 for less than 30 m/min.

(17) Depositing Characteristic of Cyclic Trimeric Oligomer

Films, 5 cm×5 cm, were cut out and heated in a hot air dryer at 150° C. for 60 minutes; the film surfaces were observed using a scanning electron microscope at 1,000×; and the number of deposits of cyclic trimeric oligomer was counted on the shot image of the surface of an arbitrarily selected film. The depositing characteristic of the cyclic trimeric oligomer was rated Good (A) for less than 5 pieces, Acceptable (B) for 5 pieces or more but less than 10 pieces, and Unacceptable (C) for 10 pieces or more, on which criteria judgements were made.

Example 1

A continuous polymerization device was used, which had a total of 5 vessels: an esterification reaction vessel composed of a first esterification reaction vessel and a second esterification reaction vessel; accompanied by a first polycondensation reaction vessel, a second polycondensation reaction vessel, and a third polycondensation reaction vessel. A reaction was carried out in the first esterification reaction vessel at a reaction temperature of 240 to 255° C. to reach an esterification reaction rate of 90 to 95%, and in the second esterification vessel at a reaction temperature of 255° C. to reach an esterification reaction rate of 97%; polycondensation reaction was carried out in the first polycondensation reaction vessel at a temperature of 260° C., in the second polycondensation reaction vessel at a temperature of 275° C., and in the third esterification reaction vessel at a temperature of 280° C. respectively; and the reactions were allowed to progress so as to achieve an intrinsic viscosity of interest. The details are described below.

In the first esterification reaction vessel, a slurry of terephthalic acid and ethylene glycol (at an ethylene glycol/terephthalic acid molar ratio of 1.05 to 1.30) was continuously added at a constant flow rate of 8.0 to 8.7 t/hr, and the esterification reaction was carried out at 245 to 255° C. with water being distilled out until an esterification reaction rate of 90 to 95% was achieved. A potassium hydroxide solution (0.216% by weight) prepared with water and ethylene glycol mixed thereinto was split and continuously added into the first esterification reaction vessel and the second esterification reaction vessel to have a concentration of 0.0005% by weight (equivalent to 0.09 mol/t) with respect to the polyester resin.

In addition, a phosphoric acid aqueous solution was continuously added to the second esterification reaction vessel to have a concentration of 0.014% by weight (equivalent to 1.428 mol/t) with respect to the polyethylene terephthalate resin composition.

In the second esterification reaction vessel, the esterification reaction was carried out at 255° C. with water being distilled out until an esterification reaction rate of 97% was achieved, whereby the esterification reaction was completed.

With regard to polycondensation reaction, the polycondensation reaction was carried out in the first polycondensation reaction vessel at a temperature of 260° C. and at a degree of vacuum of 10 kPa; antimony trioxide was added to have a concentration of 0.0127% by weight (equivalent to 0.422 mol/t) with respect to the polyester resin; and manganese acetate was added to have a concentration of 0.021% by weight (equivalent to 0.855 mol/t) with respect to the polyethylene terephthalate resin composition.

Polycondensation reaction was carried out in the second polycondensation reaction vessel at a temperature of 275° C. and at degree of vacuum of 2.2 kPa and in the third polycondensation reaction vessel at a temperature of 280° C. and at a degree of vacuum of 0.2 kPa; the resulting product was discharged at the point of time when a melt viscosity equivalent to an intrinsic viscosity of 0.65 was achieved; and the product was made into chips using a strand cutter; to obtain the polyethylene terephthalate resin composition. The obtained polyethylene terephthalate resin composition had good color tone and transparency, a low gelation ratio of 0.9% by weight, and a low ΔCOOH, which was good.

The obtained polyethylene terephthalate resin composition was dried at 150° C. for 3 hours, supplied into an extruder, melt-extruded at 285° C., and cast onto an electrostatically charged cast drum of 20° C., to obtain an unstretched sheet. This unstretched sheet was stretched 3.1-fold in the longitudinal direction using a stretching roll heated to 90° C., then stretched 3.7-fold in the transverse direction at 120° C. using a tenter type stretching machine, then heat-fixed at 230° C., and wound on a roll. The film formability was good, and the film defects of the obtained film were favorably acceptable.

Examples 2 and 3

The polyethylene terephthalate resin composition and the film were obtained in the same manner as in Example 1 except that the added amount of manganese acetate was changed to 0.014% by weight (equivalent to 0.570 mol/t) and 0.028% by weight (equivalent to 1.14 mol/t) respectively with respect to the polyethylene terephthalate resin composition in such a manner that the contents of metals were as shown in Table 2. The change in the added amount of manganese acetate increased the gelation ratio of the polyethylene terephthalate resin composition, but at an unproblematic level. In Example 3, the increase in the amount of manganese element increased the solution haze, but the film defects were at an unproblematic level.

Examples 4 to 6

The polyethylene terephthalate resin composition and the film were obtained in the same manner as in Example 1 except that 0.0046% by weight (equivalent to 0.214 mol/t) of magnesium acetate, 0.00045% by weight (equivalent to 0.059 mol/t) of calcium acetate, and 0.0075% by weight (equivalent to 0.735 mol/t) of lithium acetate with respect to the polyethylene terephthalate resin composition were respectively added to the third polycondensation reaction vessel such that the contents of metals were as shown in Table 2. In Examples 4, 5, and 6, the addition of the highly active metal catalysts increased the gelation ratio of the polyethylene terephthalate resin composition, and increased the generated amount of linear oligomer, but the film defects were at an unproblematic level.

Examples 7 and 8

The polyethylene terephthalate resin composition and the film were obtained in the same manner as in Example 1 except that the added amount of potassium hydroxide was changed to 0.0002% by weight (equivalent to 0.036 mol/t) and 0.0010% by weight (equivalent to 0.18 mol/t) respectively with respect to the polyethylene terephthalate resin composition such that the content of potassium element was as shown in Table 2.

In Example 7, the amount of potassium element was small, and the melt specific resistance exhibited an increase but at a level unproblematic for a film-forming process. In Example 8, the increase in the amount of potassium element increased the b value of the polyethylene terephthalate resin composition, and increased the largest particle size of the internal particles to 0.3 μm, but the solution haze was 0.9%, which was at an unproblematic level.

Example 9

The polyethylene terephthalate resin composition and the film were obtained in the same manner as in Example 1 except that the positions where potassium hydroxide was added were three places: the first esterification reaction vessel, the second esterification reaction vessel, and the first polycondensation reaction vessel. The addition carried out at the three places caused the polyethylene terephthalate resin composition to have a solution haze of 0.8% and caused the largest particle size of the internal particles to be 0.3 μm, which were at an unproblematic level.

Examples 10 and 11

The polyethylene terephthalate resin composition and the film were obtained in the same manner as in Example 1; except that the added amount of antimony trioxide was changed to 0.0081% by weight (0.269 mol/t) and 0.0173% by weight (equivalent to 0.575 mol/t) respectively with respect to the polyethylene terephthalate resin composition such that the content of antimony element was as shown in Table 2; and except that, in Example 10, the amount of manganese acetate was changed to 0.014% by weight (equivalent to 0.570 mol/t) with respect to the polyethylene terephthalate resin composition. In Example 10 in which the amount of antimony trioxide was reduced, the activity was lowered, and the reaction was carried out with the reaction temperature raised by 1° C., with the result that the b value and COOH terminal group amount of the polyethylene terephthalate resin composition increased but at an unproblematic level. In Example 11, the increase in the amount of antimony element increased the solution haze, but at an unproblematic level.

Example 12

The polyethylene terephthalate resin composition and the film were obtained in the same manner as in Example 1 except that the added amount of manganese acetate was changed to 0.014% by weight (equivalent to 0.570 mol/t) and the added amount of phosphoric acid was changed to 0.007% by weight (equivalent to 0.714 mol/t) with respect to the polyethylene terephthalate resin composition such that the contents of manganese element and phosphorus element were as shown in Table 2. The increase in M/P increased the gelation ratio of the polyethylene terephthalate resin composition and the generated amount of linear oligomer, but the film defects were at an unproblematic level.

Example 13

The polyethylene terephthalate resin composition and the film were obtained in the same manner as in Example 1 except that the added amount of phosphoric acid was changed to 0.021% by weight (equivalent to 2.14 mol/t) with respect to the polyethylene terephthalate resin composition such that the content of phosphorus element was as shown in Table 2. The increase in the amount of phosphorus element lowered the M/P and increased the melt specific resistance of the polyethylene terephthalate resin composition, but at a level unproblematic for a film-forming process.

Example 14

The polyethylene terephthalate resin composition and the film were obtained in the same manner as in Example 1 except that the added amount of manganese acetate was changed to 0.028% by weight (equivalent to 1.14 mol/t) with respect to the polyethylene terephthalate resin composition and the added amount of phosphoric acid was changed to 0.023% by weight (equivalent to 2.38 mol/t) with respect to the polyethylene terephthalate resin composition such that the contents of manganese element and phosphorus element were as shown in Table 2. The increase in the metal element amount of manganese increased the gelation ratio of the polyethylene terephthalate resin composition and the generated amount of linear oligomer, but the film defects were at an unproblematic level.

Examples 15 and 16

The polyethylene terephthalate resin composition and the film were obtained in the same manner as in Example 1 except that the phosphorus compound to be added was changed from phosphoric acid to triethyl phosphonoacetate and trimethyl phosphate respectively. The change in the phosphorus compound increased the gelation ratio of the polyethylene terephthalate resin composition and increased the solution haze, but the film defects were at an unproblematic level.

Example 17

The polyethylene terephthalate resin composition and the film were obtained in the same manner as in Example 1 except that the temperature of the third polycondensation reaction vessel was raised by 2° C. to increase the COOH terminal group. The rise in the reaction temperature increased the b value of the polyethylene terephthalate resin composition to 5.5 and the ΔCOOH thereof to 90 eq/t, but at an unproblematic level.

Example 18

The polyethylene terephthalate resin composition and the film were obtained in the same manner as in Example 1 except that the place where potassium hydroxide was added was only the first esterification reaction vessel. Adding potassium hydroxide at one place facilitated decomposition reaction, and increased the solution haze and gelation ratio of the polyethylene terephthalate resin composition, but the film defects were at an unproblematic level.

Example 19

In the first esterification reaction vessel, slurry of terephthalic acid and ethylene glycol (at an ethylene glycol/terephthalic acid molar ratio of 1.05 to 1.30) was continuously added at a constant flow rate of 8.0 to 8.7 t/hr, and the esterification reaction was carried out at 245 to 255° C. with water being distilled out until an esterification reaction rate of 90 to 95% was achieved. A potassium hydroxide solution (0.216% by weight) prepared with water and ethylene glycol mixed thereinto was split and continuously added into the first esterification reaction vessel and the second esterification reaction vessel to have a concentration of 0.0005% by weight (equivalent to 0.09 mol/t) with respect to the polyester resin.

In addition, a phosphoric acid aqueous solution was continuously added to the second esterification reaction vessel in such a manner as to have a concentration of 0.014% by weight (equivalent to 1.428 mol/t) with respect to the polyester resin composition.

In the second esterification reaction vessel, the esterification reaction was carried out at 255° C. with water being distilled out until an esterification reaction rate of 97% was achieved, whereby the esterification reaction was completed.

With regard to polycondensation reaction, the polycondensation reaction was carried out in the first polycondensation reaction vessel at a temperature of 260° C. and at a degree of vacuum of 10 kPa; antimony trioxide was added to have a concentration of 0.0127% by weight (equivalent to 0.422 mol/t) with respect to the polyester resin; and manganese acetate was added to have a concentration of 0.021% by weight (equivalent to 0.855 mol/t) with respect to the polyester resin composition.

Polycondensation reaction was carried out in the second polycondensation reaction vessel at a temperature of 275° C. and at degree of vacuum of 2.2 kPa and in the third polycondensation reaction vessel at a temperature of 280° C. and at a degree of vacuum of 0.2 kPa until an intrinsic viscosity of interest was achieved by carrying out the polymerization reaction. Then, nitrogen gas was used to bring the polycondensation reaction vessel back to normal pressure; and the reaction product was discharged in strand form into cold water through the die, pelletized in cylindrical form using an extrusion cutter, and preliminarily crystallized using a surface crystallizing device, to obtain the polyethylene terephthalate resin composition. The obtained liquid phase polyethylene terephthalate resin composition had an intrinsic viscosity of 0.50, a cyclic trimeric oligomer content of 1.10% by weight, and a carboxyl terminal group content of 40 eq/t.

The liquid phase polyethylene terephthalate resin composition obtained through polycondensation reaction was subjected to solid phase polymerization in nitrogen gas having a dew point of 5° C. using a continuous tower dryer at a temperature of 215° C. for 18 hours to obtain the polyethylene terephthalate resin composition. The obtained polyethylene terephthalate resin composition had good quality with an intrinsic viscosity of 0.65, a cyclic trimeric oligomer content of 0.30% by weight, a carboxyl terminal group content of 9 eq/t, an antimony element content of 110 ppm, a cyclic trimeric oligomer regeneration rate of 0.007% by weight/minute, a color tone b value of 3.9, and a transparency (solution haze) of 0.9%.

The obtained polyethylene terephthalate resin composition was dried at 150° C. for 3 hours, supplied into an extruder, melt-extruded at 285° C., and cast onto an electrostatically charged cast drum of 20° C., to obtain an unstretched sheet. This unstretched sheet was stretched 3.1-fold in the longitudinal direction using a stretching roll heated to 90° C., then stretched 3.7-fold in the transverse direction at 120° C. using a tenter type stretching machine, then heat-fixed at 230° C., and wound on a roll. The film formability was good, and the deposition characteristic and film defects of the cyclic trimeric oligomer of the obtained film were favorably acceptable.

Examples 20 and 21

The polyethylene terephthalate resin composition and the film were obtained in the same manner as in Example 19 except that the solid phase polymerization conditions were changed as shown in Table 5-1. The increase in the heat history increased the b value and gelation ratio of the polyethylene terephthalate resin composition but at an unproblematic level, and the film defects of the obtained film were favorably acceptable.

Example 22

The polyethylene terephthalate resin composition and the film were obtained in the same manner as in Example 19 except that the added amounts of manganese acetate, antimony trioxide, and phosphoric acid were changed to 0.014% by weight (equivalent to 0.570 mol/t), 0.0081% by mass (0.269 mol/t), and 0.007% by weight (equivalent to 0.714 mol/t) respectively with respect to the polyethylene terephthalate resin composition in such a manner that the contents of manganese element, antimony element, and phosphorus element were as shown in Table 2; and except that the solid phase polymerization conditions were changed as shown in Table 5-1. The dew point temperature was high, and the COOH terminal group amount of the polyethylene terephthalate resin composition exhibited an increase, but at an unproblematic level, and the film defects of the obtained film were favorably acceptable.

Example 23

The polyethylene terephthalate resin composition and the film were obtained in the same manner as in Example 19 except that the added amounts of manganese acetate and phosphoric acid were changed to 0.028% by weight (equivalent to 1.140 mol/t) and 0.013% by weight (1.332 mol/t) respectively with respect to the polyethylene terephthalate resin composition such that the contents of manganese element and phosphorus element were as shown in Table 2; and except that the solid phase polymerization conditions were changed as shown in Table 5-1. The increase in the added amount of manganese acetate increased the gelation ratio of the polyethylene terephthalate resin composition and the generated amount of linear oligomer, but at an unproblematic level, and the film defects of the obtained film were favorably acceptable.

Examples 24 to 27

The polyethylene terephthalate resin composition and the film were obtained in the same manner as in Example 19 except that the added amount of manganese acetate was changed to 0.016% by weight (0.665 mol/t), 0.026% by weight (1.045 mol/t), 0.019% by weight (0.760 mol/t), and 0.023% by weight (0.950 mol/t) respectively with respect to the polyethylene terephthalate resin composition such that the contents of manganese element and phosphorus element were as shown in Table 2. The added amount of manganese acetate was changed, but the polyethylene terephthalate resin composition had an unproblematic level of quality, and the film defects of the obtained film were favorably acceptable.

Examples 28 and 29

The polyethylene terephthalate resin composition and the film were obtained in the same manner as in Example 19 except that the added amount of potassium hydroxide was changed to 0.0002% by mass (equivalent to 0.036 mol/t) and 0.0010% by mass (equivalent to 0.18 mol/t) respectively with respect to the polyethylene terephthalate resin composition such that the content of potassium element was as shown in Table 2. The change in the added amount of potassium hydroxide resulted in exhibiting a difference in the melt specific resistance of the polyethylene terephthalate resin composition, but at an unproblematic level, and the film defects of the obtained film were favorably acceptable.

Examples 30 to 32

The polyethylene terephthalate resin composition and the film were obtained in the same manner as in Example 19 except that the added amounts of manganese acetate and antimony trioxide were changed to 0.019% by weight (0.760 mol/t) and 0.0173% by mass (equivalent to 0.575 mol/t) in Example 30, 0.019% by weight (0.760 mol/t) and 0.104% by weight (0.345 mol/t) in Example 31, and 0.016% by weight (0.328 mol/t) and 0.150% by weight (0.498 mol/t) in Example 32 respectively with respect to the polyethylene terephthalate resin composition such that the contents of manganese element and antimony element were as shown in Table 2. The increase in the added amount of antimony trioxide increased the cyclic trimeric oligomer regeneration rate of the polyethylene terephthalate resin composition, but at an unproblematic level, and the film defects of the obtained film were favorably acceptable.

Examples 33 and 34

The polyethylene terephthalate resin composition and the film were obtained in the same manner as in Example 19 except that the added amount of antimony trioxide was changed to 0.115% by weight (0.383 mol/t) and 0.138% by weight (0.460 mol/t) respectively with respect to the polyethylene terephthalate resin composition such that the content of antimony element was as shown in Table 2. The added amount of antimony trioxide was changed, but the polyethylene terephthalate resin composition had an unproblematic level of quality, and the film defects of the obtained film were favorably acceptable.

Examples 35 to 38

The polyethylene terephthalate resin composition and the film were obtained in the same manner as in Example 19 except that the added amount of potassium hydroxide was changed to 0.0003% by weight (0.054 mol/t), 0.0008% by weight (0.144 mol/t), 0.0004% by weight (0.072 mol/t), and 0.0006% by weight (0.108 mol/t) respectively with respect to the polyethylene terephthalate resin composition such that the content of potassium element was as shown in Table 2. The added amount of potassium hydroxide was changed, but the polyethylene terephthalate resin composition had an unproblematic level of quality, and the film defects of the obtained film were favorably acceptable.

Examples 39 to 42

The polyethylene terephthalate resin composition and the film were obtained in the same manner as in Example 19 except that the added amount of phosphoric acid was changed to 0.021% by weight (2.142 mol/t), 0.019% by weight (1.904 mol/t), 0.012% by weight (1.190 mol/t), and 0.016% by weight (1.666 mol/t) respectively with respect to the polyethylene terephthalate resin composition such that the content of phosphorus element was as shown in Table 2. The added amount of phosphoric acid was changed, but the polyethylene terephthalate resin composition had an unproblematic level of quality, and the film defects of the obtained film were favorably acceptable.

Comparative Examples 1 and 2

The polyethylene terephthalate resin composition and the film were obtained in the same manner as in Example 1 except that the added amount of manganese acetate was changed to 0.009% by weight (equivalent to 0.380 mol/t) and 0.033% by weight (equivalent to 1.33 mol/t) respectively with respect to the polyethylene terephthalate resin composition such that the content of manganese element was as shown in Table 8. In Comparative Example 1, the amount of manganese element was small, and the gelation ratio of the polyethylene terephthalate resin composition was 5.6% by weight, which was an inadequate result. In Comparative Example 2, the amount of manganese element was large, and the gelation ratio worsened to 7.2% by weight, which was an inadequate result.

Comparative Examples 3 and 4

The polyethylene terephthalate resin composition and the film were obtained in the same manner as in Example 1 except that the added amount of magnesium acetate in place of manganese acetate was changed to 0.0046% by weight (equivalent to 0.214 mol/t) and 0.0368% by weight (equivalent to 1.712 mol/t) respectively with respect to the polyethylene terephthalate resin composition such that the content of magnesium element was as shown in Table 8. Using magnesium acetate instead of using a manganese compound resulted in increasing the gelation ratio of the polyethylene terephthalate resin composition, which was an inadequate result. The b value and the generated amount of linear oligomer also resulted in worsening.

Comparative Examples 5 and 6

The polyethylene terephthalate resin composition and the film were obtained in the same manner as in Example 1 except that the added amount of calcium acetate in place of manganese acetate was changed to 0.00023% by weight (equivalent to 0.030 mol/t) and 0.0018% by weight (equivalent to 0.236 mol/t) respectively with respect to the polyethylene terephthalate resin composition such that the content of calcium element was as shown in Table 8. Adding calcium acetate instead of adding a manganese compound resulted in increasing the gelation ratio of the polyethylene terephthalate resin composition, which was an inadequate result.

Comparative Examples 7 and 8

The polyethylene terephthalate resin composition and the film were obtained in the same manner as in Example 1 except that the added amount of lithium acetate in place of manganese acetate was changed to 0.0075% by weight (equivalent to 0.735 mol/t) and 0.06% by weight (equivalent to 5.88 mol/t) respectively with respect to the polyethylene terephthalate resin composition such that the content of lithium element was as shown in Table 8. Adding lithium acetate instead of adding a manganese compound resulted in worsening the ΔCOOH and also increased the gelation ratio of the polyethylene terephthalate resin composition, which were inadequate results.

Comparative Examples 9 and 10

The polyethylene terephthalate resin composition and the film were obtained in the same manner as in Example 1 except that the added amount of potassium hydroxide was changed to 0.0001% by weight (equivalent to 0.018 mol/t) and 0.0015% by weight (equivalent to 0.27 mol/t) respectively with respect to the polyethylene terephthalate resin composition such that the content of potassium element was as shown in Table 8. In Comparative Example 9, the content of potassium hydroxide was small, and thus the melt specific resistance of the polyethylene terephthalate resin composition was worsened, with the result that the film formability was poor. In Comparative Example 10, the content of potassium element was large, and the gelation ratio of the polyethylene terephthalate resin composition was high, which was an inadequate result.

Comparative Example 11

Using a batch type of polymerization equipment, the esterification reaction of terephthalic acid and ethylene glycol which have a molar ratio of 1.15 at the reaction start was carried out at 140 to 260° C. with water being distilled out. After the esterification reaction was completed, 0.0127% by weight (equivalent to 0.422 mol/t) of antimony trioxide, 0.021% by weight (equivalent to 0.855 mol/t) of manganese acetate, 0.014% by weight (equivalent to 1.428 mol/t) of phosphoric acid, and 0.0005% by weight (equivalent to 0.09 mol/t) of potassium hydroxide respectively with respect to the polyethylene terephthalate resin composition were added under normal pressure; subsequently the reaction system was gradually brought down from normal pressure to 100 Pa and heated to 290° C., terminating the polycondensation reaction, to obtain the polyester composition and the film. Adopting the batch type resulted in lowered reaction efficiency accompanied by increased heat history, and increased the gelation ratio of the polyethylene terephthalate resin composition, which was an inadequate result.

Comparative Examples 12 and 13

The polyethylene terephthalate resin composition and the film were obtained in the same manner as in Example 1 except that the added amount of antimony trioxide was changed to 0.0069% by weight (0.231 mol/t) and 0.0207% by weight (equivalent to 0.693 mol/t) respectively with respect to the polyethylene terephthalate resin composition such that the content of antimony element was as shown in Table 8. In Comparative Example 13, the polymerization activity was reduced, and the increase of 2° C. in the reaction temperature increased heat history, exhibiting an increased gelation ratio, a degraded b value, and the like, which were inadequate results. In Comparative Example 14 in which the amount of antimony was increased contrarily, the activity increased, thereby increasing the generated amount of linear oligomer of the polyethylene terephthalate resin composition and also increasing the solution haze, which were inadequate results.

Comparative Examples 14 and 15

The polyethylene terephthalate resin composition and the film were obtained in the same manner as in Example 1 except that the added amount of phosphoric acid was changed to 0.005% by weight (equivalent to 0.476 mol/t) and 0.0275% by weight (equivalent to 2.618 mol/t) respectively with respect to the polyethylene terephthalate resin composition such that the content of phosphorus element was as shown in Table 8. In Comparative Example 15, the M/P increased, thereby deteriorating the gelation ratio; in Comparative Example 16, the increase in the amount of phosphorus element increased the melt specific resistance of the polyethylene terephthalate resin composition, and increased the solution haze; and thus, the results were inadequate in both Examples.

Comparative Example 16

The polyethylene terephthalate resin composition and film were obtained in the same manner as in Example 19 except that the added amounts of manganese acetate and potassium hydroxide were changed to 0.0015% by mass (equivalent to 0.646 mol/t) and 0.0010% by mass (equivalent to 0.18 mol/t) respectively with respect to the polyethylene terephthalate resin composition such that the contents of manganese element and potassium element were as shown in Table 8; except that no split addition of potassium element was carried out; and further except that the solid phase polymerization conditions were changed as shown in Table 11-1. The gelation ratio of the polyethylene terephthalate resin composition was high, and the obtained film had many film defects.

Comparative Example 17

The polyethylene terephthalate resin composition and the film were obtained in the same manner as in Example 19 except that the added amounts of magnesium acetate, lithium acetate, and potassium hydroxide, in place of manganese acetate, were changed to 0.041% by mass (equivalent to 1.93 mol/t), 0.006% by mass (equivalent to 0.588 mol/t), and 0.0008% by mass (equivalent to 0.144 mol/t) respectively with respect to the polyethylene terephthalate resin composition such that the contents of magnesium element, lithium element, and potassium element were as shown in Table 8; except that no split addition of potassium element was carried out; and further except that no solid phase polymerization was carried out. The gelation ratio and cyclic trimeric oligomer of the polyethylene terephthalate resin composition were high, and the obtained film had many film defects.

Comparative Example 18

The polyethylene terephthalate resin composition and the film were obtained in the same manner as in Example 19 except that the added amount of magnesium acetate in place of manganese acetate was changed to 0.061% by mass (equivalent to 2.87 mol/t) with respect to the polyethylene terephthalate resin composition such that the content of magnesium element was as shown in Table 8; except that no potassium acetate was added; and further except that the solid phase polymerization conditions were changed as shown in Table 11-1. The gelation ratio of the polyethylene terephthalate resin composition was high, and the obtained film had many film defects.

Comparative Example 19

The polyethylene terephthalate resin composition and the film were obtained in the same manner as in Example 19 except that the added amounts of manganese acetate and antimony trioxide were changed to 0.033% by mass (equivalent to 1.33 mol/t) and 0.023% by mass (0.767 mol/t) respectively with respect to the polyethylene terephthalate resin composition such that the contents of manganese element and antimony element were as shown in Table 8; and except that no solid phase polymerization was carried out. The gelation ratio and cyclic trimeric oligomer of the polyethylene terephthalate resin composition were high, and the obtained film had many film defects.

Comparative Example 20

The polyethylene terephthalate resin composition and the film were obtained in the same manner as in Example 19 except that the added amount of manganese acetate was changed to 0.007% by mass (equivalent to 0.285 mol/t) with respect to the polyethylene terephthalate resin composition such that the content of manganese element was as shown in Table 8. Because the M/P was low, the melt specific resistance of the polyethylene terephthalate resin composition was high, and the electrostatic casting properties were poor.

Comparative Example 21

The polyethylene terephthalate resin composition was obtained in the same manner as in Example 19 except that the added amounts of manganese acetate and antimony trioxide element were changed to 0.037% by mass (equivalent to 1.52 mol/t) and 0.0052% by mass (0.173 mol/t) respectively with respect to the polyethylene terephthalate resin composition such that the contents of manganese element and antimony element were as shown in Table 8; and further except that the solid phase polymerization temperature was changed to 222° C. The solid phase polymerization temperature was high, and the polyethylene terephthalate resin composition fused adhesively inside the device, failing to become a film.

Comparative Example 22

The polyethylene terephthalate resin composition and the film were obtained in the same manner as in Example 19 except that, in place of manganese acetate, the added amounts of magnesium acetate, lithium acetate, and antimony trioxide were changed to 0.051% by mass (equivalent to 2.35 mol/t), 0.011% by mass (equivalent to 1.029 mol/t), and 0.0087% by mass (equivalent to 0.288 mol/t) respectively with respect to the polyethylene terephthalate resin composition such that the contents of magnesium element, lithium element, and antimony element were as shown in Table 8. The gelation ratio of the polyethylene terephthalate resin composition was high, and the obtained film had many film defects.

Comparative Example 23

The polyethylene terephthalate resin composition and the film were obtained in the same manner as in Example 19 except that the added amount of potassium hydroxide was changed to 0.0020% by mass (equivalent to 0.36 mol/t) with respect to the polyethylene terephthalate resin composition such that the content of potassium element was as shown in Table 8. The solution haze of the polyethylene terephthalate resin composition was high. The obtained film had many film defects.

Comparative Example 24

The polyethylene terephthalate resin composition and the film were obtained in the same manner as in Example 19 except that the dew point in the solid phase polymerization conditions was changed to 25° C. The color tone of the polyethylene terephthalate resin composition was poor; in addition, the gelation ratio was high; and the obtained film had many film defects.

Comparative Example 25

The polyethylene terephthalate resin composition and the film were obtained in the same manner as in Example 19 except that the added amount of calcium acetate in place of manganese acetate was changed to 0.010% by mass (equivalent to 1.36 mol/t) with respect to the polyethylene terephthalate resin composition such that the content of calcium element was as shown in Table 8. The gelation ratio of the polyethylene terephthalate resin composition was high, and the obtained film had many film defects.

Comparative Example 26

The polyethylene terephthalate resin composition and the film were obtained in the same manner as in Example 19 except that the added amounts of manganese acetate, antimony trioxide, and phosphoric acid were changed to 0.033% by mass (equivalent to 1.33 mol/t), 0.014% by mass (equivalent to 0.460 mol/t), and 0.0476% by mass (equivalent to 4.90 mol/t) respectively with respect to the polyethylene terephthalate resin composition such that the contents of manganese element, antimony element, and phosphorus element were as shown in Table 8; and except that no potassium acetate was added. The content of cyclic trimeric oligomer of the polyethylene terephthalate resin composition was high, and the obtained film had many film defects. The electrostatic casting properties were poor.

Comparative Example 27

The polyethylene terephthalate resin composition and the film were obtained in the same manner as in Example 19 except that the added amounts of manganese acetate, antimony trioxide, and phosphoric acid were changed to 0.033% by mass (equivalent to 1.33 mol/t), 0.069% by mass (equivalent to 0.230 mol/t), and 0.0476% by mass (equivalent to 4.90 mol/t) respectively with respect to the polyethylene terephthalate resin composition such that the contents of manganese element, antimony element, and phosphorus element were as shown in Table 8; and except that no potassium acetate was added. The content of cyclic trimeric oligomer of the polyethylene terephthalate resin composition was high, and the obtained film had many film defects. The electrostatic casting properties were poor.

TABLE 1

| | | Liquid Phase Polymerization Conditions | | |
| --- | --- | --- | --- | --- |
| | Production | Place where Potassium Compound is added | | Phosphorus |
| | Equipment | 1st Place | 2nd Place | Compound |
| Example 1 | Continuous Type | 1st Esterification Reaction Vessel | 2nd Esterification Reaction Vessel | Phosphoric Acid |
| Example 2 | Continuous Type | 1st Esterification Reaction Vessel | 2nd Esterification Reaction Vessel | Phosphoric Acid |
| Example 3 | Continuous Type | 1st Esterification Reaction Vessel | 2nd Esterification Reaction Vessel | Phosphoric Acid |
| Example 4 | Continuous Type | 1st Esterification Reaction Vessel | 2nd Esterification Reaction Vessel | Phosphoric Acid |
| Example 5 | Continuous Type | 1st Esterification Reaction Vessel | 2nd Esterification Reaction Vessel | Phosphoric Acid |
| Example 6 | Continuous Type | 1st Esterification Reaction Vessel | 2nd Esterification Reaction Vessel | Phosphoric Acid |
| Example 7 | Continuous Type | 1st Esterification Reaction Vessel | 2nd Esterification Reaction Vessel | Phosphoric Acid |

TABLE 1-continued

| | Production Equipment | Place where Potassium Compound is added | | Phosphorus Compound |
|---|---|---|---|---|
| | | 1st Place | 2nd Place | |
| Example 8 | Continuous Type | 1st Esterification Reaction Vessel | 2nd Esterification Reaction Vessel | Phosphoric Acid |
| Example 9 | Continuous Type | 1st Esterification Reaction Vessel | 2nd Esterification Reaction Vessel/ (3rd Place: 1st Polycondensation Reaction Vessel) | Phosphoric Acid |
| Example 10 | Continuous Type | 1st Esterification Reaction Vessel | 2nd Esterification Reaction Vessel | Phosphoric Acid |
| Example 11 | Continuous Type | 1st Esterification Reaction Vessel | 2nd Esterification Reaction Vessel | Phosphoric Acid |
| Example 12 | Continuous Type | 1st Esterification Reaction Vessel | 2nd Esterification Reaction Vessel | Phosphoric Acid |
| Example 13 | Continuous Type | 1st Esterification Reaction Vessel | 2nd Esterification Reaction Vessel | Phosphoric Acid |
| Example 14 | Continuous Type | 1st Esterification Reaction Vessel | 2nd Esterification Reaction Vessel | Phosphoric Acid |
| Example 15 | Continuous Type | 1st Esterification Reaction Vessel | 2nd Esterification Reaction Vessel | TMPA |
| Example 16 | Continuous Type | 1st Esterification Reaction Vessel | 2nd Esterification Reaction Vessel | TEPA |
| Example 17 | Continuous Type | 1st Esterification Reaction Vessel | 2nd Esterification Reaction Vessel | Phosphoric Acid |
| Example 18 | Continuous Type | 1st Esterification Reaction Vessel | — | Phosphoric Acid |
| Example 19 | Continuous Type | 1st Esterification Reaction Vessel | 2nd Esterification Reaction Vessel | Phosphoric Acid |
| Example 20 | Continuous Type | 1st Esterification Reaction Vessel | 2nd Esterification Reaction Vessel | Phosphoric Acid |
| Example 21 | Continuous Type | 1st Esterification Reaction Vessel | 2nd Esterification Reaction Vessel | Phosphoric Acid |
| Example 22 | Continuous Type | 1st Esterification Reaction Vessel | 2nd Esterification Reaction Vessel | Phosphoric Acid |
| Example 23 | Continuous Type | 1st Esterification Reaction Vessel | 2nd Esterification Reaction Vessel | Phosphoric Acid |
| Example 24 | Continuous Type | 1st Esterification Reaction Vessel | 2nd Esterification Reaction Vessel | Phosphoric Acid |
| Example 25 | Continuous Type | 1st Esterification Reaction Vessel | 2nd Esterification Reaction Vessel | Phosphoric Acid |
| Example 26 | Continuous Type | 1st Esterification Reaction Vessel | 2nd Esterification Reaction Vessel | Phosphoric Acid |
| Example 27 | Continuous Type | 1st Esterification Reaction Vessel | 2nd Esterification Reaction Vessel | Phosphoric Acid |
| Example 28 | Continuous Type | 1st Esterification Reaction Vessel | 2nd Esterification Reaction Vessel | Phosphoric Acid |
| Example 29 | Continuous Type | 1st Esterification Reaction Vessel | 2nd Esterification Reaction Vessel | Phosphoric Acid |
| Example 30 | Continuous Type | 1st Esterification Reaction Vessel | 2nd Esterification Reaction Vessel | Phosphoric Acid |
| Example 31 | Continuous Type | 1st Esterification Reaction Vessel | 2nd Esterification Reaction Vessel | Phosphoric Acid |
| Example 32 | Continuous Type | 1st Esterification Reaction Vessel | 2nd Esterification Reaction Vessel | Phosphoric Acid |
| Example 33 | Continuous Type | 1st Esterification Reaction Vessel | 2nd Esterification Reaction Vessel | Phosphoric Acid |
| Example 34 | Continuous Type | 1st Esterification Reaction Vessel | 2nd Esterification Reaction Vessel | Phosphoric Acid |
| Example 35 | Continuous Type | 1st Esterification Reaction Vessel | 2nd Esterification Reaction Vessel | Phosphoric Acid |
| Example 36 | Continuous Type | 1st Esterification Reaction Vessel | 2nd Esterification Reaction Vessel | Phosphoric Acid |
| Example 37 | Continuous Type | 1st Esterification Reaction Vessel | 2nd Esterification Reaction Vessel | Phosphoric Acid |
| Example 38 | Continuous Type | 1st Esterification Reaction Vessel | 2nd Esterification Reaction Vessel | Phosphoric Acid |
| Example 39 | Continuous Type | 1st Esterification Reaction Vessel | 2nd Esterification Reaction Vessel | Phosphoric Acid |
| Example 40 | Continuous Type | 1st Esterification Reaction Vessel | 2nd Esterification Reaction Vessel | Phosphoric Acid |
| Example 41 | Continuous Type | 1st Esterification Reaction Vessel | 2nd Esterification Reaction Vessel | Phosphoric Acid |
| Example 42 | Continuous Type | 1st Esterification Reaction Vessel | 2nd Esterification Reaction Vessel | Phosphoric Acid |

TMPA: Trimethyl Phosphate
TEPA: Triethyl Phosphonoacetate

TABLE 2

| | Metal Content in Liquid-Phase-Polymerized Polymer | | | | | | | | | |
|---|---|---|---|---|---|---|---|---|---|---|
| | Antimony ppm | Manganese ppm | Potassium ppm | Phosphorus ppm | Magnesium ppm | Calcium ppm | Lithium ppm | Total of Mg, Ca, Li ppm | Mn/Sb | M/P |
| Example 1 | 110 | 45 | 5 | 30 | 0 | 0 | 0 | 0 | 0.91 | 0.91 |
| Example 2 | 110 | 30 | 5 | 30 | 0 | 0 | 0 | 0 | 0.60 | 0.63 |
| Example 3 | 110 | 60 | 5 | 30 | 0 | 0 | 0 | 0 | 1.21 | 1.19 |
| Example 4 | 110 | 45 | 5 | 30 | 5 | 0 | 0 | 5 | 0.91 | 1.12 |
| Example 5 | 110 | 45 | 5 | 30 | 0 | 10 | 0 | 10 | 0.91 | 1.17 |
| Example 6 | 110 | 45 | 5 | 30 | 0 | 0 | 5 | 5 | 0.91 | 1.28 |
| Example 7 | 110 | 45 | 2 | 30 | 0 | 0 | 0 | 0 | 0.91 | 0.87 |
| Example 8 | 110 | 45 | 10 | 30 | 0 | 0 | 0 | 0 | 0.91 | 0.98 |
| Example 9 | 110 | 45 | 5 | 30 | 0 | 0 | 0 | 0 | 0.91 | 0.91 |
| Example 10 | 70 | 30 | 5 | 30 | 0 | 0 | 0 | 0 | 0.95 | 0.63 |
| Example 11 | 150 | 45 | 5 | 30 | 0 | 0 | 0 | 0 | 0.66 | 0.91 |
| Example 12 | 110 | 30 | 5 | 15 | 0 | 0 | 0 | 0 | 0.60 | 1.26 |
| Example 13 | 110 | 45 | 5 | 45 | 0 | 0 | 0 | 0 | 0.91 | 0.61 |
| Example 14 | 110 | 60 | 5 | 50 | 0 | 0 | 0 | 0 | 1.21 | 0.72 |
| Example 15 | 110 | 45 | 5 | 30 | 0 | 0 | 0 | 0 | 0.91 | 0.91 |
| Example 16 | 110 | 45 | 5 | 30 | 0 | 0 | 0 | 0 | 0.91 | 0.91 |
| Example 17 | 110 | 45 | 5 | 30 | 0 | 0 | 0 | 0 | 0.91 | 0.91 |
| Example 18 | 110 | 45 | 5 | 30 | 0 | 0 | 0 | 0 | 0.91 | 0.91 |
| Example 19 | 110 | 45 | 5 | 30 | 0 | 0 | 0 | 0 | 0.91 | 0.91 |
| Example 20 | 110 | 45 | 5 | 30 | 0 | 0 | 0 | 0 | 0.91 | 0.91 |
| Example 21 | 110 | 45 | 5 | 30 | 0 | 0 | 0 | 0 | 0.91 | 0.91 |
| Example 22 | 70 | 30 | 5 | 15 | 0 | 0 | 0 | 0 | 0.95 | 1.26 |
| Example 23 | 110 | 60 | 5 | 28 | 0 | 0 | 0 | 0 | 1.21 | 1.28 |

TABLE 2-continued

| | Metal Content in Liquid-Phase-Polymerized Polymer | | | | | | | | | |
|---|---|---|---|---|---|---|---|---|---|---|
| | Antimony ppm | Manganese ppm | Potassium ppm | Phosphorus ppm | Magnesium ppm | Calcium ppm | Lithium ppm | Total of Mg, Ca, Li ppm | Mn/Sb | M/P |
| Example 24 | 110 | 35 | 5 | 30 | 0 | 0 | 0 | 0 | 0.71 | 0.72 |
| Example 25 | 110 | 55 | 5 | 30 | 0 | 0 | 0 | 0 | 1.11 | 1.10 |
| Example 26 | 110 | 40 | 5 | 30 | 0 | 0 | 0 | 0 | 0.81 | 0.82 |
| Example 27 | 110 | 50 | 5 | 30 | 0 | 0 | 0 | 0 | 1.01 | 1.01 |
| Example 28 | 110 | 45 | 2 | 30 | 0 | 0 | 0 | 0 | 0.91 | 0.87 |
| Example 29 | 110 | 45 | 10 | 30 | 0 | 0 | 0 | 0 | 0.91 | 0.98 |
| Example 30 | 150 | 40 | 5 | 30 | 0 | 0 | 0 | 0 | 0.59 | 0.82 |
| Example 31 | 90 | 40 | 5 | 30 | 0 | 0 | 0 | 0 | 0.99 | 0.82 |
| Example 32 | 130 | 35 | 5 | 30 | 0 | 0 | 0 | 0 | 0.60 | 0.72 |
| Example 33 | 100 | 45 | 5 | 30 | 0 | 0 | 0 | 0 | 1.00 | 0.91 |
| Example 34 | 120 | 45 | 5 | 30 | 0 | 0 | 0 | 0 | 0.83 | 0.91 |
| Example 35 | 110 | 45 | 3 | 30 | 0 | 0 | 0 | 0 | 0.91 | 0.89 |
| Example 36 | 110 | 45 | 8 | 30 | 0 | 0 | 0 | 0 | 0.91 | 0.95 |
| Example 37 | 110 | 45 | 4 | 30 | 0 | 0 | 0 | 0 | 0.91 | 0.90 |
| Example 38 | 110 | 45 | 6 | 30 | 0 | 0 | 0 | 0 | 0.91 | 0.92 |
| Example 39 | 110 | 45 | 5 | 45 | 0 | 0 | 0 | 0 | 0.91 | 0.61 |
| Example 40 | 110 | 45 | 5 | 40 | 0 | 0 | 0 | 0 | 0.91 | 0.68 |
| Example 41 | 110 | 45 | 5 | 25 | 0 | 0 | 0 | 0 | 0.91 | 1.09 |
| Example 42 | 110 | 45 | 5 | 35 | 0 | 0 | 0 | 0 | 0.91 | 0.78 |

TABLE 3

| | Quality of Liquid-Phase-Polymerized Polymer | | | | | | | | |
|---|---|---|---|---|---|---|---|---|---|
| | Intrinsic Viscosity dl/g | b Value | Melt Specific Resistance ×10$^8$ Ω·cm | Gelation Ratio % by weight | Largest Particle Size of Internal Particles μm | COOH Terminal Group eq/t | ΔCOOH eq/t | Solution Haze % | Generated Amount of Linear Oligomer μg/g |
| Example 1 | 0.650 | 3.9 | 2.5 | 0.9 | 0.1 | 30 | 60 | 0.6 | 180 |
| Example 2 | 0.650 | 4.0 | 2.9 | 1.5 | 0.2 | 32 | 68 | 0.6 | 179 |
| Example 3 | 0.649 | 4.5 | 2.3 | 3.5 | 0.3 | 34 | 72 | 0.8 | 203 |
| Example 4 | 0.650 | 5.0 | 2.3 | 3.7 | 0.1 | 33 | 78 | 0.6 | 190 |
| Example 5 | 0.651 | 5.6 | 2.2 | 4.2 | 0.2 | 32 | 80 | 0.6 | 195 |
| Example 6 | 0.650 | 5.4 | 1.9 | 4.7 | 0.1 | 33 | 81 | 0.5 | 188 |
| Example 7 | 0.649 | 4.1 | 3.4 | 1.3 | 0.2 | 30 | 63 | 0.5 | 183 |
| Example 8 | 0.648 | 4.7 | 2.6 | 2.1 | 0.3 | 36 | 65 | 0.9 | 199 |
| Example 9 | 0.651 | 3.9 | 2.5 | 1.0 | 0.3 | 39 | 61 | 0.8 | 182 |
| Example 10 | 0.650 | 4.6 | 3.0 | 2.2 | 0.2 | 42 | 60 | 0.5 | 189 |
| Example 11 | 0.650 | 4.6 | 2.9 | 2.1 | 0.3 | 28 | 72 | 0.8 | 205 |
| Example 12 | 0.650 | 4.1 | 3.2 | 2.9 | 0.2 | 38 | 74 | 0.6 | 199 |
| Example 13 | 0.651 | 4.3 | 4.0 | 3.3 | 0.3 | 34 | 67 | 0.9 | 180 |
| Example 14 | 0.651 | 4.5 | 3.9 | 3.4 | 0.5 | 35 | 68 | 1.0 | 182 |
| Example 15 | 0.649 | 4.2 | 2.9 | 2.7 | 0.4 | 33 | 65 | 0.8 | 190 |
| Example 16 | 0.648 | 4.5 | 3.2 | 3.4 | 0.4 | 35 | 63 | 1.0 | 192 |
| Example 17 | 0.650 | 5.5 | 2.5 | 1.5 | 0.2 | 50 | 90 | 0.7 | 210 |
| Example 18 | 0.651 | 5.3 | 2.6 | 4.6 | 0.6 | 32 | 70 | 1.1 | 198 |

TABLE 4

| | Film Characteristics | |
|---|---|---|
| | Defects | Electrostatic Casting Properties |
| Example 1 | Acceptable | Grade 1 |
| Example 2 | Acceptable | Grade 1 |
| Example 3 | Acceptable | Grade 1 |
| Example 4 | Acceptable | Grade 1 |
| Example 5 | Acceptable | Grade 1 |
| Example 6 | Acceptable | Grade 1 |
| Example 7 | Acceptable | Grade 2 |
| Example 8 | Acceptable | Grade 1 |
| Example 9 | Acceptable | Grade 1 |
| Example 10 | Acceptable | Grade 2 |
| Example 11 | Acceptable | Grade 1 |
| Example 12 | Acceptable | Grade 2 |
| Example 13 | Acceptable | Grade 2 |
| Example 14 | Acceptable | Grade 2 |
| Example 15 | Acceptable | Grade 1 |
| Example 16 | Acceptable | Grade 2 |
| Example 17 | Acceptable | Grade 1 |
| Example 18 | Acceptable | Grade 1 |

TABLE 5-1

| | Quality of Liquid-Phase-Polymerized Polymer | | | | Solid Phase Polymerization Conditions | | |
|---|---|---|---|---|---|---|---|
| | Intrinsic Viscosity dl/g | Solution Haze % | Largest Particle Size of Internal Particles μm | COOH Terminal Group eq/t | Temperature °C. | Time hr | Dew Point Temperature °C. |
| Example 19 | 0.480 | 0.6 | 0.10 | 34 | 212 | 40 | 5 |
| Example 20 | 0.480 | 0.6 | 0.10 | 34 | 210 | 50 | 5 |
| Example 21 | 0.480 | 0.6 | 0.10 | 34 | 215 | 33 | 5 |
| Example 22 | 0.400 | 0.4 | 0.20 | 40 | 220 | 23 | 20 |
| Example 23 | 0.520 | 0.8 | 0.22 | 25 | 200 | 100 | −5 |
| Example 24 | 0.450 | 0.6 | 0.15 | 28 | 212 | 40 | 5 |
| Example 25 | 0.500 | 0.6 | 0.18 | 37 | 212 | 40 | 5 |
| Example 26 | 0.460 | 0.6 | 0.15 | 38 | 212 | 40 | 5 |
| Example 27 | 0.520 | 0.6 | 0.10 | 31 | 212 | 40 | 5 |
| Example 28 | 0.480 | 0.6 | 0.10 | 34 | 212 | 40 | 5 |
| Example 29 | 0.480 | 0.6 | 0.10 | 34 | 212 | 40 | 5 |
| Example 30 | 0.520 | 1.0 | 0.30 | 32 | 212 | 40 | 5 |
| Example 31 | 0.460 | 0.6 | 0.20 | 37 | 212 | 40 | 5 |
| Example 32 | 0.480 | 0.9 | 0.25 | 34 | 212 | 40 | 5 |
| Example 33 | 0.480 | 0.8 | 0.15 | 34 | 212 | 40 | 5 |
| Example 34 | 0.480 | 1.0 | 0.18 | 34 | 212 | 40 | 5 |
| Example 35 | 0.480 | 0.6 | 0.10 | 34 | 212 | 40 | 5 |
| Example 36 | 0.480 | 0.6 | 0.10 | 34 | 212 | 40 | 5 |
| Example 37 | 0.480 | 0.6 | 0.10 | 34 | 212 | 40 | 5 |
| Example 38 | 0.480 | 0.6 | 0.10 | 34 | 212 | 40 | 5 |
| Example 39 | 0.480 | 0.6 | 0.10 | 34 | 212 | 40 | 5 |
| Example 40 | 0.480 | 0.6 | 0.10 | 34 | 212 | 40 | 5 |
| Example 41 | 0.480 | 0.6 | 0.10 | 34 | 212 | 40 | 5 |
| Example 42 | 0.480 | 0.6 | 0.10 | 34 | 212 | 40 | 5 |

TABLE 5-2

| | Quality of Solid-Phase-Polymerized Polymer | | | | | | | | |
|---|---|---|---|---|---|---|---|---|---|
| | Intrinsic Viscosity dl/g | b Value | Melt Specific Resistance ×10$^8$ Ω·cm | Gelation Ratio % by weight | COOH Terminal Group eq/t | ΔCOOH eq/t | Content of Cyclic Trimeric Oligomer in Resin Composition % by weight | Cyclic Trimeric Oligomer Regeneration Rate % by weight/minute | Generated Amount of Linear Oligomer μg/g |
| Example 19 | 0.650 | 3.9 | 1.9 | 2.1 | 8 | 60 | 0.29 | 0.009 | 180 |
| Example 20 | 0.650 | 4.1 | 2.2 | 2.5 | 9 | 60 | 0.30 | 0.009 | 182 |
| Example 21 | 0.650 | 4.1 | 2.2 | 2.3 | 8 | 60 | 0.30 | 0.009 | 178 |
| Example 22 | 0.650 | 4.0 | 2.1 | 1.5 | 20 | 70 | 0.29 | 0.009 | 179 |
| Example 23 | 0.650 | 4.5 | 2.0 | 2.3 | 20 | 65 | 0.40 | 0.009 | 203 |
| Example 24 | 0.650 | 3.9 | 1.9 | 2.1 | 18 | 65 | 0.30 | 0.009 | 180 |
| Example 25 | 0.650 | 3.9 | 1.9 | 2.1 | 18 | 65 | 0.30 | 0.009 | 180 |
| Example 26 | 0.650 | 3.9 | 1.9 | 2.1 | 18 | 65 | 0.30 | 0.010 | 180 |
| Example 27 | 0.650 | 3.9 | 1.9 | 2.1 | 18 | 65 | 0.30 | 0.010 | 180 |
| Example 28 | 0.650 | 4.1 | 2.5 | 1.3 | 20 | 65 | 0.30 | 0.010 | 183 |
| Example 29 | 0.650 | 4.7 | 2.4 | 2.1 | 20 | 60 | 0.30 | 0.010 | 199 |
| Example 30 | 0.650 | 4.0 | 2.4 | 2.2 | 22 | 80 | 0.30 | 0.015 | 189 |
| Example 31 | 0.650 | 4.0 | 2.4 | 2.2 | 22 | 60 | 0.35 | 0.010 | 189 |
| Example 32 | 0.650 | 4.6 | 2.1 | 2.1 | 28 | 75 | 0.30 | 0.012 | 205 |
| Example 33 | 0.650 | 4.0 | 2.4 | 2.2 | 22 | 60 | 0.30 | 0.010 | 189 |
| Example 34 | 0.650 | 4.0 | 2.2 | 2.1 | 19 | 60 | 0.30 | 0.010 | 202 |
| Example 35 | 0.600 | 4.1 | 1.9 | 2.9 | 20 | 60 | 0.30 | 0.009 | 210 |
| Example 36 | 0.600 | 4.1 | 1.9 | 2.9 | 20 | 60 | 0.30 | 0.009 | 210 |
| Example 37 | 0.600 | 4.1 | 1.9 | 2.9 | 20 | 60 | 0.30 | 0.009 | 210 |
| Example 38 | 0.600 | 4.1 | 1.9 | 2.9 | 20 | 60 | 0.30 | 0.009 | 210 |
| Example 39 | 0.600 | 3.9 | 2.1 | 2.1 | 19 | 60 | 0.30 | 0.009 | 195 |
| Example 40 | 0.600 | 4.3 | 2.1 | 2.5 | 18 | 60 | 0.30 | 0.009 | 190 |
| Example 41 | 0.600 | 4.3 | 2.1 | 2.5 | 18 | 60 | 0.30 | 0.010 | 190 |
| Example 42 | 0.600 | 4.3 | 2.1 | 2.5 | 18 | 60 | 0.30 | 0.010 | 190 |

TABLE 6

| | Defects | Content of Cyclic Trimeric Oligomer % by weight | Deposition Characteristic of Cyclic Trimeric Oligomer | Electrostatic Casting Properties |
|---|---|---|---|---|
| Example 19 | Acceptable | 0.43 | A | Grade 1 |
| Example 20 | Acceptable | 0.44 | A | Grade 1 |
| Example 21 | Acceptable | 0.44 | A | Grade 1 |
| Example 22 | Acceptable | 0.44 | A | Grade 1 |
| Example 23 | Acceptable | 0.55 | B | Grade 1 |
| Example 24 | Acceptable | 0.44 | A | Grade 1 |
| Example 25 | Acceptable | 0.44 | A | Grade 1 |
| Example 26 | Acceptable | 0.44 | A | Grade 1 |
| Example 27 | Acceptable | 0.44 | A | Grade 1 |
| Example 28 | Acceptable | 0.44 | A | Grade 2 |
| Example 29 | Acceptable | 0.44 | A | Grade 2 |
| Example 30 | Acceptable | 0.44 | A | Grade 2 |
| Example 31 | Acceptable | 0.50 | B | Grade 2 |
| Example 32 | Acceptable | 0.45 | B | Grade 1 |
| Example 33 | Acceptable | 0.44 | A | Grade 2 |
| Example 34 | Acceptable | 0.44 | A | Grade 1 |
| Example 35 | Acceptable | 0.44 | A | Grade 1 |
| Example 36 | Acceptable | 0.44 | A | Grade 1 |
| Example 37 | Acceptable | 0.44 | A | Grade 1 |
| Example 38 | Acceptable | 0.44 | A | Grade 1 |
| Example 39 | Acceptable | 0.44 | A | Grade 1 |
| Example 40 | Acceptable | 0.44 | A | Grade 1 |
| Example 41 | Acceptable | 0.44 | A | Grade 1 |
| Example 42 | Acceptable | 0.44 | A | Grade 1 |

TABLE 7

| | Liquid Phase Polymerization Conditions | | | |
|---|---|---|---|---|
| | Production Equipment | Place where Potassium Compound is added | | Phosphorus Compound |
| | | 1st Place | 2nd Place | |
| Comparative Example 1 | Continuous Type | 1st Esterification Reaction Vessel | 2nd Esterification Reaction Vessel | Phosphoric Acid |
| Comparative Example 2 | Continuous Type | 1st Esterification Reaction Vessel | 2nd Esterification Reaction Vessel | Phosphoric Acid |
| Comparative Example 3 | Continuous Type | 1st Esterification Reaction Vessel | 2nd Esterification Reaction Vessel | Phosphoric Acid |
| Comparative Example 4 | Continuous Type | 1st Esterification Reaction Vessel | 2nd Esterification Reaction Vessel | TMPA |
| Comparative Example 5 | Continuous Type | 1st Esterification Reaction Vessel | 2nd Esterification Reaction Vessel | Phosphoric Acid |
| Comparative Example 6 | Continuous Type | 1st Esterification Reaction Vessel | 2nd Esterification Reaction Vessel | Phosphoric Acid |
| Comparative Example 7 | Continuous Type | 1st Esterification Reaction Vessel | 2nd Esterification Reaction Vessel | Phosphoric Acid |
| Comparative Example 8 | Continuous Type | 1st Esterification Reaction Vessel | 2nd Esterification Reaction Vessel | Phosphoric Acid |
| Comparative Example 9 | Continuous Type | 1st Esterification Reaction Vessel | 2nd Esterification Reaction Vessel | Phosphoric Acid |
| Comparative Example 10 | Continuous Type | 1st Esterification Reaction Vessel | 2nd Esterification Reaction Vessel | Phosphoric Acid |
| Comparative Example 11 | Batch Type | 1st Esterification Reaction Vessel | 2nd Esterification Reaction Vessel | Phosphoric Acid |
| Comparative Example 12 | Continuous Type | 1st Esterification Reaction Vessel | 2nd Esterification Reaction Vessel | Phosphoric Acid |
| Comparative Example 13 | Continuous Type | 1st Esterification Reaction Vessel | 2nd Esterification Reaction Vessel | Phosphoric Acid |
| Comparative Example 14 | Continuous Type | 1st Esterification Reaction Vessel | 2nd Esterification Reaction Vessel | Phosphoric Acid |
| Comparative Example 15 | Continuous Type | 1st Esterification Reaction Vessel | 2nd Esterification Reaction Vessel | Phosphoric Acid |
| Comparative Example 16 | Continuous Type | 1st Esterification Reaction Vessel | 2nd Esterification Reaction Vessel | Phosphoric Acid |
| Comparative Example 17 | Continuous Type | 1st Esterification Reaction Vessel | 2nd Esterification Reaction Vessel | Phosphoric Acid |
| Comparative Example 18 | Continuous Type | 1st Esterification Reaction Vessel | 2nd Esterification Reaction Vessel | Phosphoric Acid |
| Comparative Example 19 | Continuous Type | 1st Esterification Reaction Vessel | 2nd Esterification Reaction Vessel | Phosphoric Acid |
| Comparative Example 20 | Continuous Type | 1st Esterification Reaction Vessel | 2nd Esterification Reaction Vessel | Phosphoric Acid |
| Comparative Example 21 | Continuous Type | 1st Esterification Reaction Vessel | 2nd Esterification Reaction Vessel | Phosphoric Acid |
| Comparative Example 22 | Continuous Type | 1st Esterification Reaction Vessel | 2nd Esterification Reaction Vessel | Phosphoric Acid |
| Comparative Example 23 | Continuous Type | 1st Esterification Reaction Vessel | 2nd Esterification Reaction Vessel | Phosphoric Acid |
| Comparative Example 24 | Continuous Type | 1st Esterification Reaction Vessel | 2nd Esterification Reaction Vessel | Phosphoric Acid |
| Comparative Example 25 | Continuous Type | 1st Esterification Reaction Vessel | 2nd Esterification Reaction Vessel | Phosphoric Acid |
| Comparative Example 26 | Continuous Type | 1st Esterification Reaction Vessel | 2nd Esterification Reaction Vessel | Phosphoric Acid |
| Comparative Example 27 | Continuous Type | 1st Esterification Reaction Vessel | 2nd Esterification Reaction Vessel | Phosphoric Acid |

TMPA: Trimethyl Phosphate

TABLE 8

| | Metal Content in Liquid-Phase-Polymerized Polymer | | | | | | | | | |
|---|---|---|---|---|---|---|---|---|---|---|
| | Antimony ppm | Manganese ppm | Potassium ppm | Phosphorus ppm | Magnesium ppm | Calcium ppm | Lithium ppm | Total of Mg, Ca, Li ppm | Mn/Sb | M/P |
| Comparative Example 1 | 110 | 20 | 5 | 30 | 0 | 0 | 0 | 0 | 0.40 | 0.44 |
| Comparative Example 2 | 110 | 70 | 5 | 30 | 0 | 0 | 0 | 0 | 1.41 | 1.38 |
| Comparative Example 3 | 110 | 0 | 5 | 30 | 5 | 0 | 0 | 5 | 0.00 | 0.28 |
| Comparative Example 4 | 60 | 0 | 5 | 9 | 40 | 0 | 0 | 40 | 0.00 | 5.88 |
| Comparative Example 5 | 110 | 0 | 5 | 30 | 0 | 5 | 0 | 5 | 0.00 | 0.19 |
| Comparative Example 6 | 110 | 0 | 8 | 30 | 0 | 40 | 0 | 40 | 0.00 | 1.14 |

TABLE 8-continued

Metal Content in Liquid-Phase-Polymerized Polymer

| | Antimony ppm | Manganese ppm | Potassium ppm | Phosphorus ppm | Magnesium ppm | Calcium ppm | Lithium ppm | Total of Mg, Ca, Li ppm | Mn/Sb | M/P |
|---|---|---|---|---|---|---|---|---|---|---|
| Comparative Example 7 | 110 | 0 | 5 | 30 | 0 | 0 | 5 | 5 | 0.00 | 0.44 |
| Comparative Example 8 | 110 | 0 | 5 | 30 | 0 | 0 | 40 | 40 | 0.00 | 3.04 |
| Comparative Example 9 | 110 | 45 | 1 | 30 | 0 | 0 | 0 | 0 | 0.91 | 0.86 |
| Comparative Example 10 | 110 | 45 | 15 | 30 | 0 | 0 | 0 | 0 | 0.91 | 1.04 |
| Comparative Example 11 | 110 | 45 | 5 | 30 | 0 | 0 | 0 | 0 | 0.91 | 0.91 |
| Comparative Example 12 | 60 | 45 | 5 | 30 | 0 | 0 | 0 | 0 | 1.66 | 0.91 |
| Comparative Example 13 | 180 | 45 | 5 | 30 | 0 | 0 | 0 | 0 | 0.55 | 0.91 |
| Comparative Example 14 | 110 | 45 | 5 | 10 | 0 | 0 | 0 | 0 | 0.91 | 2.74 |
| Comparative Example 15 | 110 | 45 | 5 | 55 | 0 | 0 | 0 | 0 | 0.91 | 0.50 |
| Comparative Example 16 | 134 | 34 | 10 | 15 | 0 | 0 | 0 | 0 | 0.56 | 1.54 |
| Comparative Example 17 | 60 | 0 | 8 | 9 | 45 | 0 | 4 | 49 | 0.00 | 7.72 |
| Comparative Example 18 | 10 | 0 | 0 | 65 | 67 | 0 | 0 | 67 | 0.00 | 1.31 |
| Comparative Example 19 | 200 | 70 | 0 | 46 | 0 | 0 | 0 | 0 | 0.78 | 0.86 |
| Comparative Example 20 | 110 | 15 | 5 | 30 | 0 | 0 | 0 | 0 | 0.30 | 0.35 |
| Comparative Example 21 | 45 | 80 | 5 | 30 | 0 | 0 | 0 | 0 | 3.94 | 1.57 |
| Comparative Example 22 | 75 | 0 | 2 | 27 | 55 | 0 | 7 | 62 | 0.00 | 3.20 |
| Comparative Example 23 | 110 | 45 | 20 | 30 | 0 | 0 | 0 | 0 | 0.91 | 1.11 |
| Comparative Example 24 | 110 | 45 | 5 | 30 | 0 | 0 | 0 | 0 | 0.91 | 0.91 |
| Comparative Example 25 | 110 | 45 | 5 | 30 | 0 | 230 | 0 | 230 | 0.91 | 6.84 |
| Comparative Example 26 | 120 | 70 | 0 | 102 | 0 | 0 | 0 | 0 | 1.29 | 0.39 |
| Comparative Example 27 | 60 | 70 | 0 | 102 | 0 | 0 | 0 | 0 | 2.59 | 0.39 |

TABLE 9

Quality of Liquid-Phase-Polymerized Polymer

| | Intrinsic Viscosity dl/g | b Value — | Melt Specific Resistance ×10⁸ Ω·cm | Gelation Ratio % by weight | Largest Particle Size of Internal Particles μm | COOH Terminal Group eq/t | ΔCOOH eq/t | Solution Haze % | Generated Amount of Linear Oligomer μg/g |
|---|---|---|---|---|---|---|---|---|---|
| Comparative Example 1 | 0.649 | 4.2 | 4.5 | 5.6 | 0.2 | 30 | 62 | 0.5 | 182 |
| Comparative Example 2 | 0.650 | 6.2 | 2.3 | 7.2 | 0.4 | 35 | 72 | 1.2 | 215 |
| Comparative Example 3 | 0.649 | 5.5 | 2.0 | 10.2 | 0.3 | 33 | 90 | 0.5 | 220 |
| Comparative Example 4 | 0.648 | 7.8 | 1.5 | 21.3 | 0.1 | 34 | 115 | 0.5 | 250 |
| Comparative Example 5 | 0.650 | 5.2 | 2.2 | 6.2 | 0.2 | 30 | 85 | 0.7 | 193 |
| Comparative Example 6 | 0.649 | 6.5 | 1.8 | 13.5 | 0.4 | 32 | 102 | 0.8 | 210 |
| Comparative Example 7 | 0.651 | 4.9 | 0.9 | 7.0 | 0.3 | 33 | 110 | 0.7 | 190 |
| Comparative Example 8 | 0.651 | 6.3 | 0.3 | 18.8 | 0.6 | 37 | 120 | 1.0 | 220 |
| Comparative Example 9 | 0.649 | 4.6 | 4.5 | 1.5 | 0.1 | 31 | 62 | 0.5 | 184 |
| Comparative Example 10 | 0.649 | 5.6 | 1.9 | 5.2 | 1.3 | 35 | 1.2 | 1.3 | 192 |
| Comparative Example 11 | 0.650 | 5.6 | 2.6 | 5.1 | 0.2 | 36 | 72 | 0.7 | 199 |
| Comparative Example 12 | 0.648 | 8.0 | 5.2 | 6.2 | 0.1 | 41 | 115 | 0.5 | 210 |
| Comparative Example 13 | 0.649 | 4.0 | 5.3 | 5.3 | 0.6 | 30 | 65 | 1.6 | 220 |
| Comparative Example 14 | 0.650 | 4.3 | 2.0 | 9.2 | 0.1 | 34 | 100 | 0.5 | 185 |
| Comparative Example 15 | 0.651 | 4.7 | 10.0 | 5.2 | 0.9 | 37 | 75 | 1.3 | 180 |

TABLE 10

| | Film Characteristics | |
|---|---|---|
| | Defects | Electrostatic Casting Properties |
| Comparative Example 1 | Acceptable | Grade 2 |
| Comparative Example 2 | Not Acceptable | Grade 1 |
| Comparative Example 3 | Not Acceptable | Grade 1 |
| Comparative Example 4 | Not Acceptable | Grade 1 |
| Comparative Example 5 | Not Acceptable | Grade 3 |
| Comparative Example 6 | Not Acceptable | Grade 1 |
| Comparative Example 7 | Not Acceptable | Grade 1 |
| Comparative Example 8 | Not Acceptable | Grade 1 |
| Comparative Example 9 | Acceptable | Grade 3 |
| Comparative Example 10 | Acceptable | Grade 1 |
| Comparative Example 11 | Acceptable | Grade 1 |
| Comparative Example 12 | Not Acceptable | Grade 3 |
| Comparative Example 13 | Acceptable | Grade 3 |
| Comparative Example 14 | Not Acceptable | Grade 1 |
| Comparative Example 15 | Acceptable | Grade 4 |

TABLE 11-1

| | Quality of Liquid-Phase-Polymerized Polymer | | | | Solid Phase Polymerization Conditions | | |
|---|---|---|---|---|---|---|---|
| | Intrinsic Viscosity dl/g | Solution Haze % | Largest Particle Size of Internal Particles μm | COOH Terminal Group eq/t | Temperature °C. | Time hr | Dew Point Temperature °C. |
| Comparative Example 16 | 0.500 | 1.0 | 0.50 | 40 | 212 | 30 | −50 |
| Comparative Example 17 | 0.500 | 0.8 | 0.50 | 35 | — | — | — |
| Comparative Example 18 | 0.500 | 1.1 | 0.50 | 28 | 212 | 25 | −56 |
| Comparative Example 19 | 0.500 | 2.2 | 0.50 | 35 | — | — | — |
| Comparative Example 20 | 0.500 | 0.9 | 0.10 | 36 | 215 | 35 | 5 |
| Comparative Example 21 | 0.500 | 0.7 | 0.10 | 36 | 222 | 20 | 5 |
| Comparative Example 22 | 0.500 | 0.6 | 0.10 | 36 | 215 | 35 | 5 |
| Comparative Example 23 | 0.500 | 1.2 | 0.10 | 40 | 215 | 35 | 5 |
| Comparative Example 24 | 0.500 | 0.8 | 0.10 | 40 | 215 | 35 | 25 |
| Comparative Example 25 | 0.500 | 2.8 | 0.10 | 40 | 215 | 35 | 5 |
| Comparative Example 26 | 0.500 | 0.8 | 0.40 | 40 | 215 | 35 | 5 |
| Comparative Example 27 | 0.440 | 0.8 | 0.40 | 40 | 215 | 35 | 5 |

TABLE 11-2

| | Quality of Solid-Phase-Polymerized Polymer | | | | | | | | |
|---|---|---|---|---|---|---|---|---|---|
| | Intrinsic Viscosity dl/g | b Value | Melt Specific Resistance ×10⁸ Ω·cm | Gelation Ratio % by weight | COOH Terminal Group eq/t | ΔCOOH eq/t | Content of Cyclic Trimeric Oligomer in Resin Composition % by weight | Cyclic Trimeric Oligomer Regeneration Rate % by weight/minute | Generated Amount of Linear Oligomer μg/g |
| Comparative Example 16 | 0.850 | 6.0 | 2.1 | 10.0 | 25 | 90 | 0.28 | 0.010 | 300 |
| Comparative Example 17 | — | — | 0.8 | 7.0 | — | — | 1.10 | — | — |
| Comparative Example 18 | 0.780 | 9.0 | 1.1 | 21.0 | 15 | 90 | 0.29 | 0.010 | 280 |
| Comparative Example 19 | — | — | — | 15.0 | — | — | 1.12 | — | — |
| Comparative Example 20 | 0.630 | 4.0 | 12 | 2.0 | 21 | 90 | 0.31 | 0.010 | 189 |
| Comparative Example 21 | 0.650 | 6.0 | 2.3 | 7.0 | 20 | 90 | 0.29 | 0.010 | 262 |
| Comparative Example 22 | 0.630 | 6.0 | 0.7 | 22.0 | 21 | 70 | 0.28 | 0.010 | 323 |
| Comparative Example 23 | 0.630 | 4.0 | 2.2 | 2.8 | 21 | 90 | 0.30 | 0.010 | 190 |
| Comparative Example 24 | 0.580 | 6.5 | 2.4 | 5.5 | 30 | 70 | 0.30 | 0.010 | 219 |
| Comparative Example 25 | 0.630 | 4.0 | 2.4 | 5.5 | 21 | 70 | 0.30 | 0.010 | 219 |
| Comparative Example 26 | 0.630 | 4.0 | 8.5 | 5.5 | 21 | 70 | 0.38 | 0.010 | 219 |
| Comparative Example 27 | 0.560 | 4.0 | 9.3 | 5.5 | 21 | 70 | 0.45 | 0.010 | 219 |

TABLE 12

| | Film Characteristics | | | |
|---|---|---|---|---|
| | Defects | Content of Cyclic Trimeric Oligomer % by weight | Deposition Characteristic of Cyclic Trimeric Oligomer | Electrostatic Casting Properties |
| Comparative Example 16 | Not Acceptable | 0.48 | B | Grade 1 |
| Comparative Example 17 | Not Acceptable | 1.09 | C | Grade 1 |
| Comparative Example 18 | Not Acceptable | 1.13 | C | Grade 2 |
| Comparative Example 19 | Not Acceptable | 1.15 | C | Grade 2 |
| Comparative Example 20 | Acceptable | 0.50 | B | Grade 4 |
| Comparative Example 21 | — | — | — | — |
| Comparative Example 22 | Not Acceptable | 0.48 | B | Grade 1 |
| Comparative Example 23 | Acceptable | 0.49 | B | Grade 1 |
| Comparative Example 24 | Not Acceptable | 0.47 | B | Grade 1 |
| Comparative Example 25 | Not Acceptable | 0.47 | B | Grade 1 |
| Comparative Example 26 | Not Acceptable | 0.54 | B | Grade 3 |
| Comparative Example 27 | Not Acceptable | 0.56 | B | Grade 3 |

The invention claimed is:

1. A polyethylene terephthalate resin composition, having a manganese element content of 30 to 60 ppm, a potassium element content of 2 to 10 ppm, and an antimony element content of 70 to 150 ppm with respect to the total weight of elements of the polyethylene terephthalate resin composition, wherein a molar ratio of metal elements to phosphorus element, (M/P=(M1+M2/2)/P), satisfies formula (1):

$$0.6 \leq (M1+M2/2)/P \leq 1.3 \quad (1)$$

wherein M1 represents the content (mol/t) of Mn and, optionally, at least one of a bivalent metal element selected from the group consisting of Mg and Ca;

M2 represents the content (mol/t) of a monovalent metal element selected from the group consisting of Li and K; and P represents the content (mol/t) of phosphorus element;

the total content of metal elements: Mg, Ca, and Li is less than 0.1 ppm;

the content of phosphorus element is 15 ppm to 45 ppm; and the composition has a gelation ratio of 5% by weight or less.

2. The polyethylene terephthalate resin composition according to claim 1, wherein the composition generates linear oligomer in an amount of 210 μg/g or less when melted at 290° C. for 20 minutes.

3. The polyethylene terephthalate resin composition according to claim 1, wherein the composition comprises internal particles whose largest particle diameter is 0.3 μm or less, and has 1.0% or less of solution haze.

4. The polyethylene terephthalate resin composition according to claim 1, having a COOH terminal group content of 25 to 40 eq/t, wherein the COOH terminal group amount (ΔCOOH) increases after heat-moisture treatment by 80 eq/t or less.

5. The polyethylene terephthalate resin composition according to claim 1, having an intrinsic viscosity of 0.60 to 0.70, a COOH terminal group content of 5 to 20 eq/t, and 0.40% by weight or less of cyclic trimeric oligomer.

6. A polyester film formed from the polyethylene terephthalate resin composition according to claim 1.

* * * * *